United States Patent
Wei et al.

(10) Patent No.: US 8,913,465 B2
(45) Date of Patent: Dec. 16, 2014

(54) SEISMIC VIBRATOR HAVING COMPOSITE BASEPLATE

(75) Inventors: Zhouhong Wei, Sugar Land, TX (US); Thomas Phillips, Stafford, TX (US)

(73) Assignee: Inova, Ltd., George Town (KY)

( * ) Notice: Subject to any disclaimer, the term of this patent is extended or adjusted under 35 U.S.C. 154(b) by 528 days.

(21) Appl. No.: 13/274,022

(22) Filed: Oct. 14, 2011

(65) Prior Publication Data

US 2012/0269040 A1    Oct. 25, 2012

Related U.S. Application Data

(60) Provisional application No. 61/393,129, filed on Oct. 14, 2010.

(51) Int. Cl.
| | | |
|---|---|---|
| *G01V 1/06* | (2006.01) | |
| *G01M 7/04* | (2006.01) | |
| *G01V 1/145* | (2006.01) | |

(52) U.S. Cl.
CPC . *G01M 7/04* (2013.01); *G01V 1/145* (2013.01)
USPC ...................................................... 367/189

(58) Field of Classification Search
USPC ....................................................... 367/189
See application file for complete search history.

(56) References Cited

U.S. PATENT DOCUMENTS

| | | | |
|---|---|---|---|
| 3,405,780 A | 10/1968 | Coburn et al. | |
| 4,406,345 A | 9/1983 | Fair | |
| 4,664,222 A | 5/1987 | Jones et al. | |
| 4,676,337 A | 6/1987 | Martin | |
| 4,922,473 A | 5/1990 | Sallas et al. | |
| 5,419,524 A | 5/1995 | Evans et al. | |
| 5,461,835 A | 10/1995 | Tarics | |
| 6,029,803 A | 2/2000 | Ovadia et al. | |
| 6,488,117 B1 * | 12/2002 | Owen | 181/121 |
| 6,552,961 B1 | 4/2003 | Bremmer et al. | |
| 7,628,248 B2 * | 12/2009 | Wei et al. | 181/106 |
| 7,639,567 B2 | 12/2009 | Sitton et al. | |
| 7,881,158 B2 * | 2/2011 | Tenghamn | 367/168 |
| 7,929,380 B2 * | 4/2011 | Wei et al. | 367/190 |
| 8,462,585 B2 * | 6/2013 | Sitton et al. | 367/58 |
| 2006/0207216 A1 | 9/2006 | Kurath-Groll-Mann et al. | |
| 2007/0240930 A1 | 10/2007 | Wei et al. | |
| 2007/0250269 A1 | 10/2007 | Wei et al. | |
| 2009/0073807 A1 | 3/2009 | Sitton et al. | |
| 2009/0321175 A1 | 12/2009 | Tenghamn | |
| 2010/0149922 A1 | 6/2010 | Sitton et al. | |
| 2010/0276224 A1 | 11/2010 | Wei | |

OTHER PUBLICATIONS

International Search Report and Written Opinion from counterpart PCT Appl. No. PCT/US2011/056411, mailed Jan. 20, 2012.

* cited by examiner

*Primary Examiner* — Isam Alsomiri
*Assistant Examiner* — James Hulka
(74) *Attorney, Agent, or Firm* — Mossman, Kumar & Tyler, PC

(57) ABSTRACT

A seismic vibrator has a baseplate composed at least partially of a composite material. The baseplate has a body composed of the composite material and has top and bottom plates composed of a metallic material. The top plate supports isolators for isolating the vibrator's mass and frame from the baseplate. Internally, the composite body has a central structure to which couple stilts for supporting the mass and a piston for the vibrator's actuator. A lattice structure surrounds the central structure. This lattice structure has radial ribs extending from the central structure and has radial ribs interconnecting the radial ribs.

19 Claims, 22 Drawing Sheets

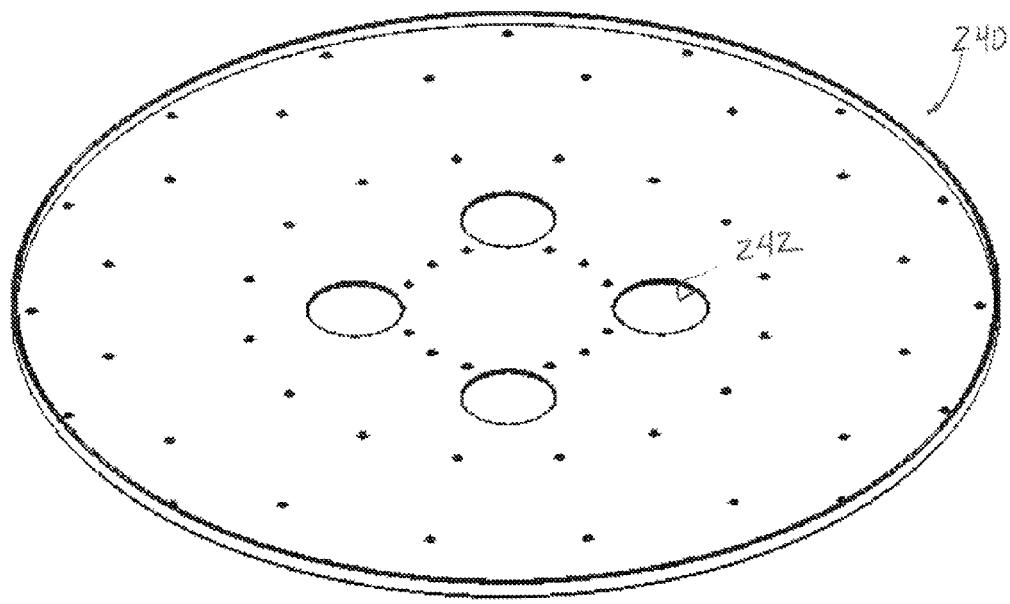
FIG. 9
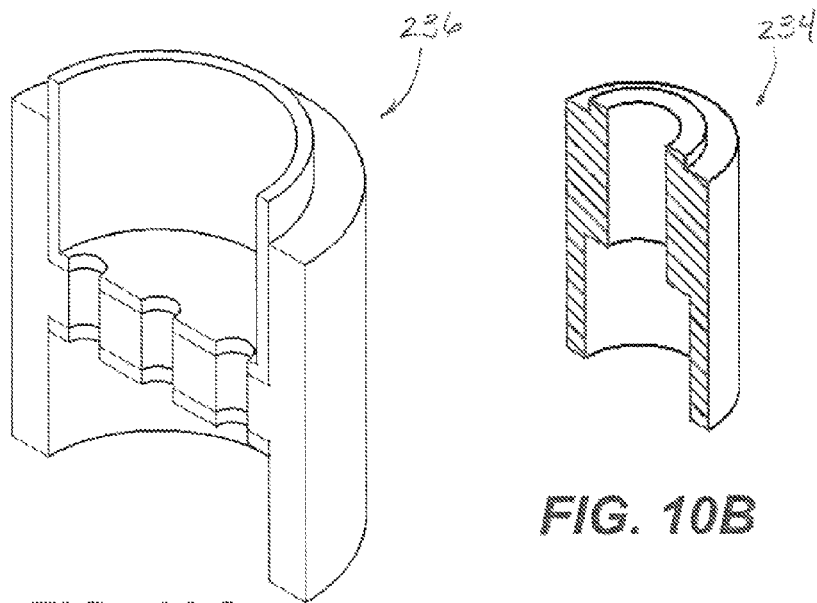
FIG. 10A
FIG. 10B

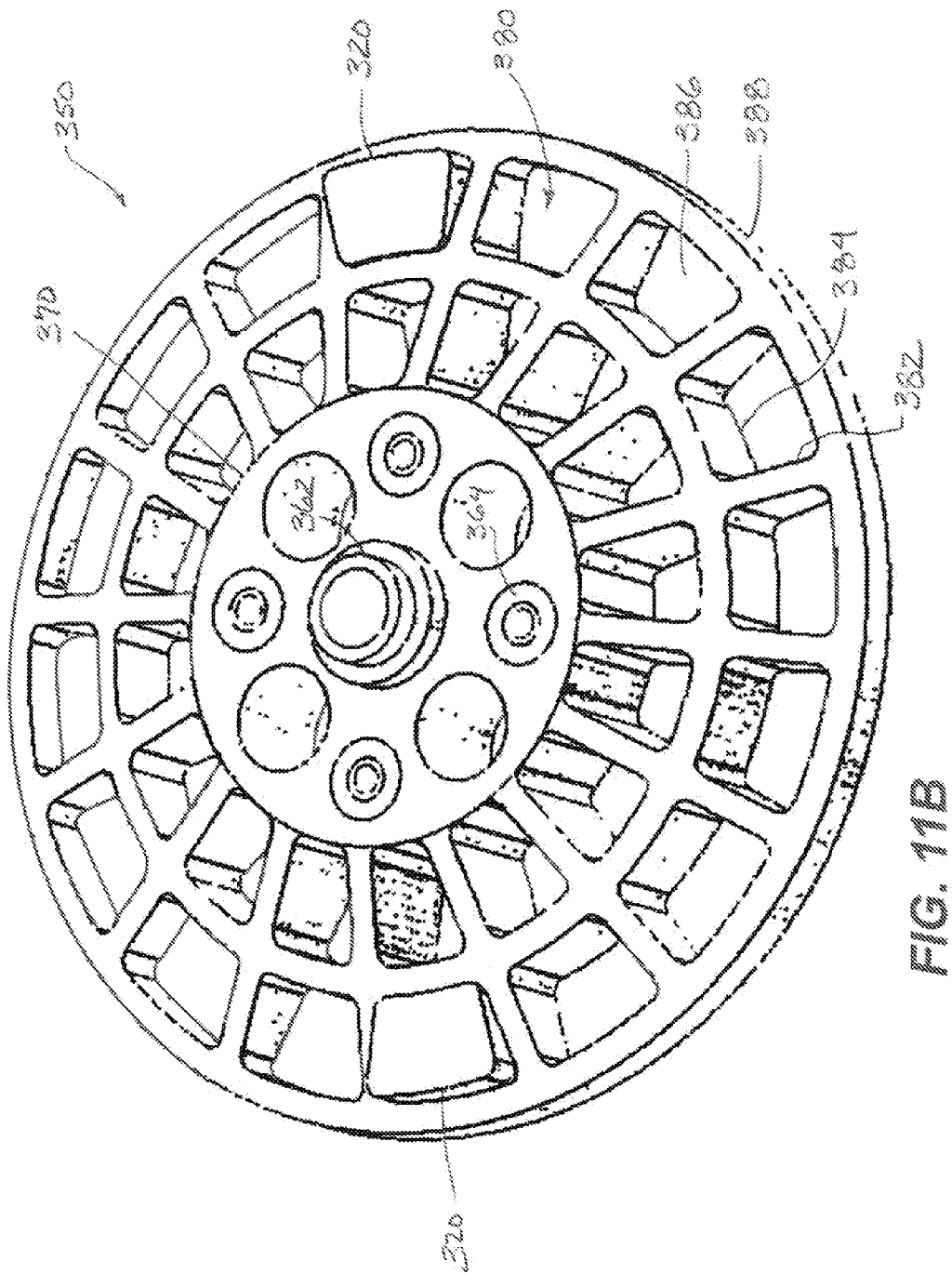

SEISMIC VIBRATOR HAVING COMPOSITE BASEPLATE

CROSS-REFERENCES TO RELATED APPLICATIONS

This is a non-provisional of U.S. Appl. No. 61/393,129, filed 14 Oct. 2010, which is incorporated herein by reference and to which priority is claimed.

BACKGROUND OF THE DISCLOSURE

In a geophysical survey, a seismic source can be carried by a truck and positioned at a predetermined location in an area of exploration. The seismic source can be a single axis vibratory source and can impart compressing P-waves into the earth once coupled to the earth and operated. A vibrator 10 according to the prior art is illustrated in FIG. 1A and is diagrammatically illustrated in FIG. 1B. The vibrator 10 transmits force into the ground using a baseplate 20 and a reaction mass 50.

As is typical, the vibrator 10 is mounted on a carrier vehicle (not shown) that uses a mechanism and bars 12/14 to lower the vibrator 10 to the ground. With the vibrator 10 lowered, the weight of the vehicle holds the baseplate 20 engaged with the ground so seismic source signals can be transmitted into the earth. The reaction mass 50 positions directly above baseplate 20 and stilts 52 extend from the baseplate 20 and through the mass 50 to stabilize it.

Internally, the reaction mass 50 has a cylinder 56 formed therein. A vertically extending piston 60 extends through this cylinder 56, and a head 62 on the piston 60 divides the cylinder 56 into upper and lower chambers. The piston 60 connects at its lower end to a hub in a lower cross-piece 54L and extends upward through the cylinder 56. The piston 60's upper end connects to a hub on an upper cross-piece 54U, and the cross pieces 54U-L connect to the stilts 52.

To isolate the baseplate 20 from the bars 14, the bars 14 have feet 16 with isolators 40 disposed between the feet 16 and the baseplate 20. In addition, the feet 16 have tension members 42 interconnected between the edges of the feet 16 and the baseplate 20. The tension members 42 are used to hold the baseplate 20 when the vibrator 10 is raised and lowered to the ground. Finally, shock absorbers 44 are also mounted between the bottom of the feet 16 and the baseplate 20 to isolate vibrations therebetween.

During operation, a controller 80 as shown in FIG. 1B receives signals from a first sensor 85 coupled to the upper cross-piece 54U and receives signals from a second sensor 87 coupled to the reaction mass 50. Based on feedback from these sensors 85/87 and a desired sweep signal for operating the vibrator 10, the controller 80 generates a drive signal to control a servo valve assembly 82. Driven by the drive signal, the servo valve assembly 82 alternatingly routes high pressure hydraulic fluid between a hydraulic fluid supply 84 and upper and lower cylinder piston chambers via ports in the mass 50. As hydraulic fluid alternatingly accumulates in the piston's chambers located immediately above and below the piston head 62, the reaction mass 50 reciprocally vibrates in a vertical direction on the piston 60. In turn, the force generated by the vibrating mass 50 transfers to the baseplate 20 via the stilts 52 and the piston 60 so that the baseplate 20 vibrates at a desired amplitude and frequency or sweep to generate a seismic source signal into the ground.

As the moving reaction mass 50 acts upon the baseplate 20 to impart a seismic source signal into the earth, the signal travels through the earth, reflects at discontinuities and formations, and then travels toward the earth's surface. At the surface, an array of geophone receivers (not shown) coupled to the earth detects the reflected signal, and a recording device records the signals from the geophone receivers. The seismic recorder can use a correlation processor to correlate the computed ground force supplied by the seismic source to the seismic signals received by the geophone receivers.

As can be seen, an essential component of the vibrator 10 is its baseplate 20. FIGS. 2A-2C show the baseplate 20 for the prior art vibrator 10 in plan, side, and end-sectional views. The top of the plate 20 has stilt mounts 24 for the stilts (52; FIG. 1B), and a reinforcement pad 21 surrounds these mounts 24. Retaining ledges 26 are provided for the isolators (40). The long edges near the corners have forked hangers 28 to which ends of the tension members (42) connect, and reinforcement pads 27 are provided around the outside edges of the plate 20 for connecting the shock absorbers (44) to the baseplate 20.

Overall, the baseplate 20 can have a height $H_1$ of about 6.9-in., a width $W_1$ of about 42-in., and a length $L_1$ of about 96-in., and the plate 20 can weight approximately 4020-lbs. As shown in the end section of FIG. 2C, the plate 20 has four internal tubes or beams 30 that run longitudinally along the plate's length. The beams 30 are hollow tubes with rectangular cross-sections and have a height of about 6-in., a width of about 4-in., and a wall thickness of about ⅜-in. Interconnecting spacers 32 position between the beams 30 and between the long cap walls of the baseplate 20.

When operating such a prior art vibrator 10, operators experience problems in accurately imparting desired force into the ground with the vibrator 10 and the baseplate 20. Ideally, operators would like the vibrator 10 to efficiently impart force into the ground with the baseplate 20. Also, operators would like to know the actual ground force applied by the baseplate 20 to the ground when imparting the seismic energy. Unfortunately, the baseplate 20 experiences a great deal of vibration and flexure that can distort or interfere with the ideal operation of the baseplate 20.

Although the typical prior art vibrator and baseplate may be effective, operators are continually seeking more efficient ways to impart seismic energy into the ground for a seismic survey.

SUMMARY OF THE DISCLOSURE

A seismic vibrator has a baseplate, a mass, an actuator, and a controller. The mass is movably disposed relative to the baseplate for imparting vibrational energy thereto, and the actuator is coupled to the mass for moving the mass relative to the baseplate. The controller is communicatively coupled to the actuator and controls operation of the actuator.

Rather than having a conventional construction, the baseplate has a core body composed of a composite material and has top and bottom plates composed of a metallic material. The top plate supports isolators for isolating the vibrator's mass and frame from the baseplate. Internally, the composite core body has a central structure to which couple stilts for supporting the mass and to which couples a piston for the vibrator's actuator. A lattice structure surrounds the central structure. This lattice structure has main or radial ribs extending from the central structure and has circumferential or interconnecting ribs interconnecting the radial ribs.

Journals are disposed in the body from a central mount at the top surface to the bottom surface. The stilts for supporting the mass couple to these journals. A central journal is also disposed in the body, and the piston for the actuator disposed through the mass couples to the central journal.

The baseplate can have a top component and a bottom component that connect together to form the core body. The top component has a top surface and an outer wall extending therefrom, while the bottom component has a bottom surface and an inner wall extending therefrom. The top component positions on the bottom component with the outer sidewall fitting around the inner wall.

Finally, the bottom surface of the baseplate can have a round perimeter, while the top surface can have a rectangular perimeter with shelves extending beyond the round perimeter of the bottom surface. The baseplate, however, can have any desirable shape, including, for example, round, square, rectangular, polygonal.

The foregoing summary is not intended to summarize each potential embodiment or every aspect of the present disclosure.

BRIEF DESCRIPTION OF THE DRAWINGS

FIG. 9 shows the bottom plate of the disclosed baseplate in an upper perspective view.

FIG. 10A shows a cross-section of a piston journal for the disclosed baseplate.

FIG. 10B shows a cross-section of a stilt journal for the disclosed baseplate.

FIGS. 11A-11B show perspective views of another baseplate with a composite body according to the present disclosure.

DETAILED DESCRIPTION OF THE DISCLOSURE

A. Seismic Vibrator

FIGS. 3A-3D show perspective, front, side, and cross-sectional views of a seismic vibrator 100 according to certain teachings of the present disclosure. The vibrator 100 has a frame 110, a moveable reaction mass 150, and a baseplate 200. The frame 110 and mass 150 can be constructed mainly of metal, such as steel or the like. By contrast, the baseplate 200 is at least partially composed of a composite material as described in more detail later.

Figure 1A:
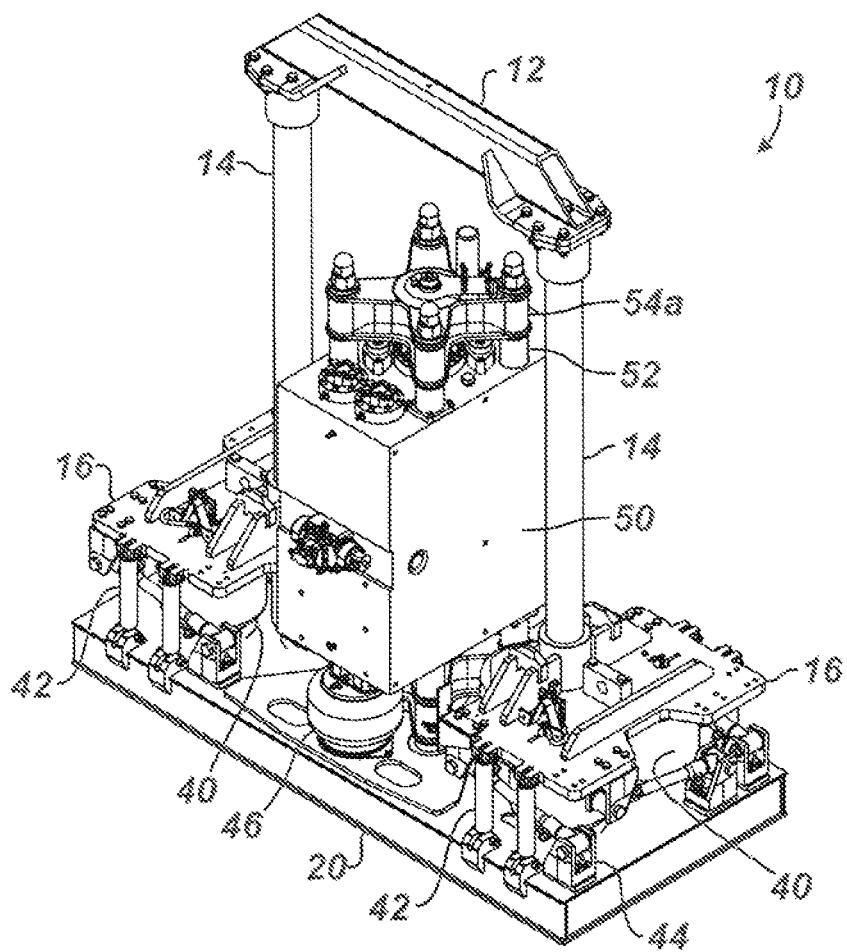
FIG. 1A shows a vibrator according to the prior art in a perspective view.
Figure 1B:
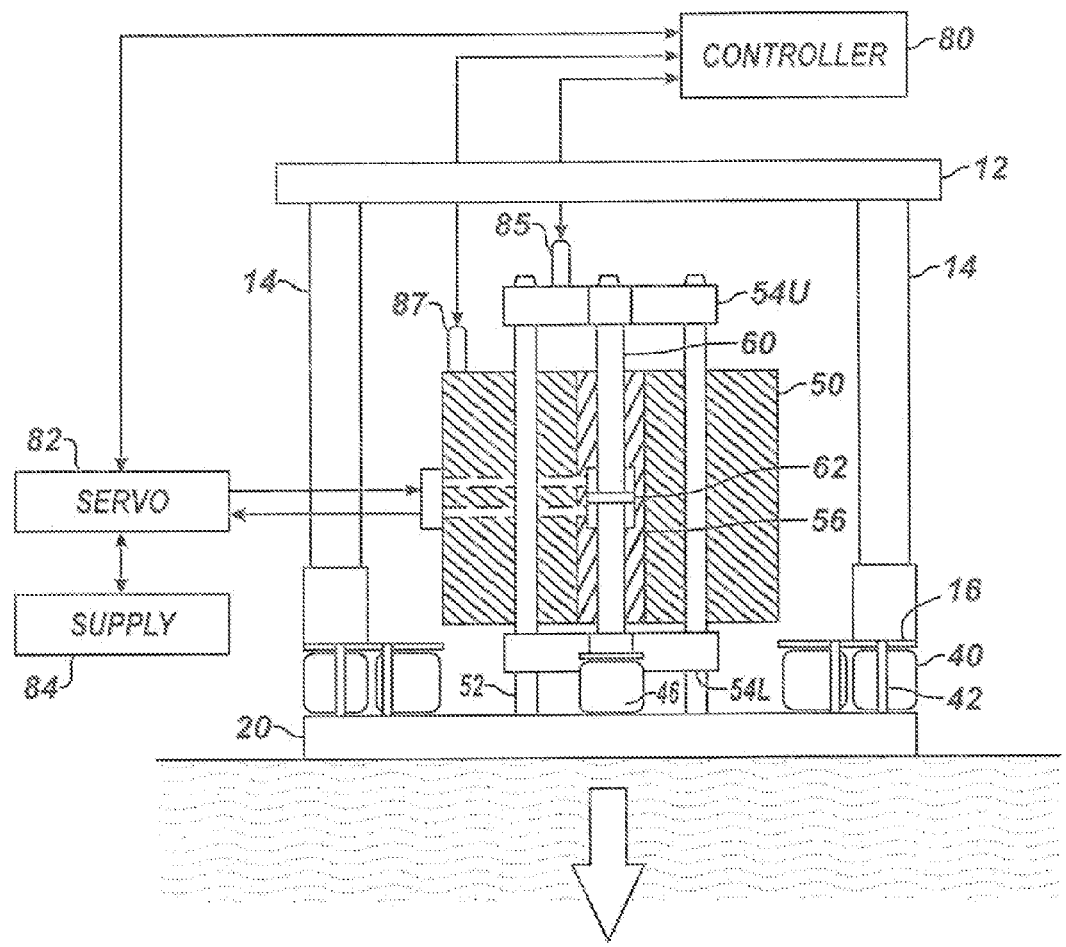
FIG. 1B schematically illustrates the prior art vibrator of FIG. 1A.

In general, the vibrator 100 transmits force to the ground using the baseplate 200 and the reaction mass 150, and the vibrator 100 can operate similar to the vibrator detailed previously with reference to FIGS. 1A-1B. As is typical, for example, the vibrator 100 is mounted on a carrier or vehicle (not shown) that uses the frame 110 to lower the vibrator 100 to the ground. With the vibrator 100 lowered, the weight of the vehicle holds the baseplate 200 engaged with the ground so seismic source signals can be transmitted into the earth during operation. Other details of how the vibrator 100 couples to the ground with a vehicle or other carrier are well known in the art and not detailed herein.

When the vibrator 100 is operated, the moving reaction mass 150 acts upon the baseplate 200 to impart a seismic source signal into the ground. The seismic signal travels through the ground, reflects at discontinuities and formations, and travels toward the surface. Sensors coupled to the ground are arranged in an array spaced apart from the vibrator 100. These sensors detect the reflected source signal, and a recording station typically housed in a truck record the signals from the sensors. The recording station includes a seismic recorder and can also include a correlation processor. Such a correlation processor receives a signal from the vibrator 100 indicative of the source signal imparted into the earth and correlates the received signal with the recorded signals.

As shown, the reaction mass 150 positions directly above the baseplate 200. A support 160 extends from the baseplate 200 through the mass 150 and stabilizes the reaction mass 150. The support 160 is typically constructed using stilts 162, which can be tubular pipes or rods made of steel or the like. These stilts 162 have ends affixed to the baseplate 200 and extend upward from the baseplate 200 and through the reaction mass 150. An upper cross-piece 164, which may be constructed from steel, couples to the top ends of the stilts 162 and provides stability to the support 160 as the mass 150 vibrates. Isolators 146 are provided on the baseplate 200 below the reaction mass 150 for isolating vibrations.

As noted above, the carrier vehicle applies its static weight to the baseplate 200 via the frame 110 to hold the baseplate 200 against the ground. Yet, the contribution of the frame 110 and vehicle to the resulting seismic force applied to the ground is preferably kept to a minimum. Therefore, several isolators 140 are used between the frame 110 and the baseplate 200 to isolate motion of the baseplate 200 from the frame 110 and the vehicle.

As shown in FIGS. 3A-3D, the frame 110 has vertical support bars 114 and a horizontal bar 112 connected to the tops of these vertical bars 114. At their distal ends, the vertical bars 114 connect to feet 116. In turn, these feet 116 connect to the baseplate 200 using an arrangement of isolators 140, pivotable pistons 144, and tension members 142. The arrangement of these components (140, 142, 144) essentially isolates the frame 110 from the baseplate 200 and the movable mass 150 supported thereon. In addition, the arrangement allows the vibratory force of the mass 150 to be applied to the ground via the baseplate 200 while minimizing the amount of force permitted to transmit back through the frame 110 to the supporting vehicle.

Each vertical bar 114 couples to one of the feet 116. The pistons 144 pivotably connect between these feet 116 and the baseplate 200 and act as shock absorbers. The tension members 144 connect the outer edges of the feet 116 to the outer edge of the baseplate 200 and support the plate 200 to the feet 116 when the vibrator 100 is lifted off the ground.

For their part, the isolators 140 can be air bags or other isolating elements known and used in the art. The isolators 140 are situated somewhat outside of the main footprint of the baseplate 200. In particular, the outside corners of the feet 116 extend beyond the baseplate's footprint. Similarly, shelves 218 on the baseplate 200 extend from its edges to support the isolators 140 disposed between these shelves 218 and the extended corners of the feet 116.

Figure 3A:
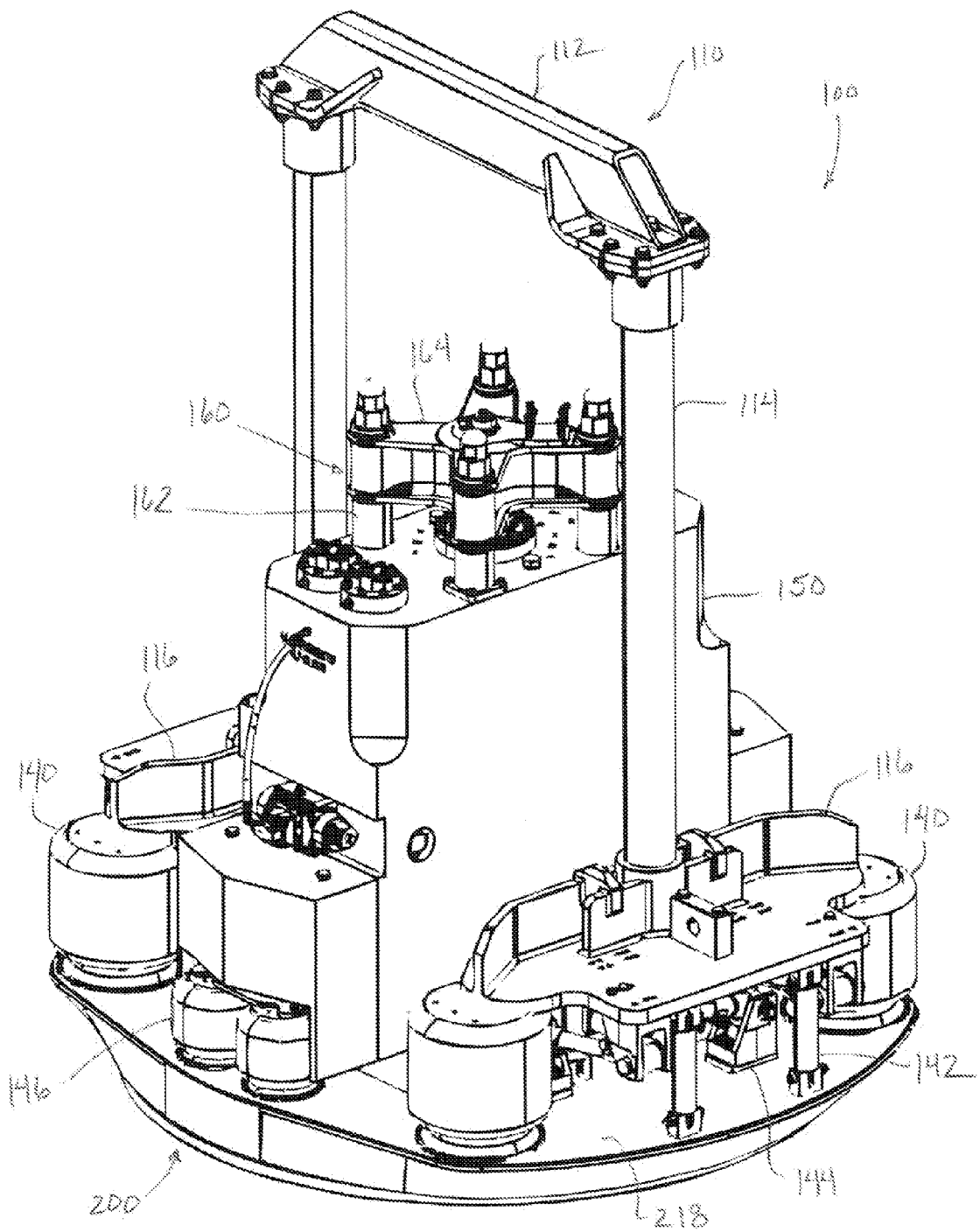
FIGS. 3A-3D show a vibrator according to the present disclosure in perspective, front, side, and cross-sectional views.
Figure 3B:
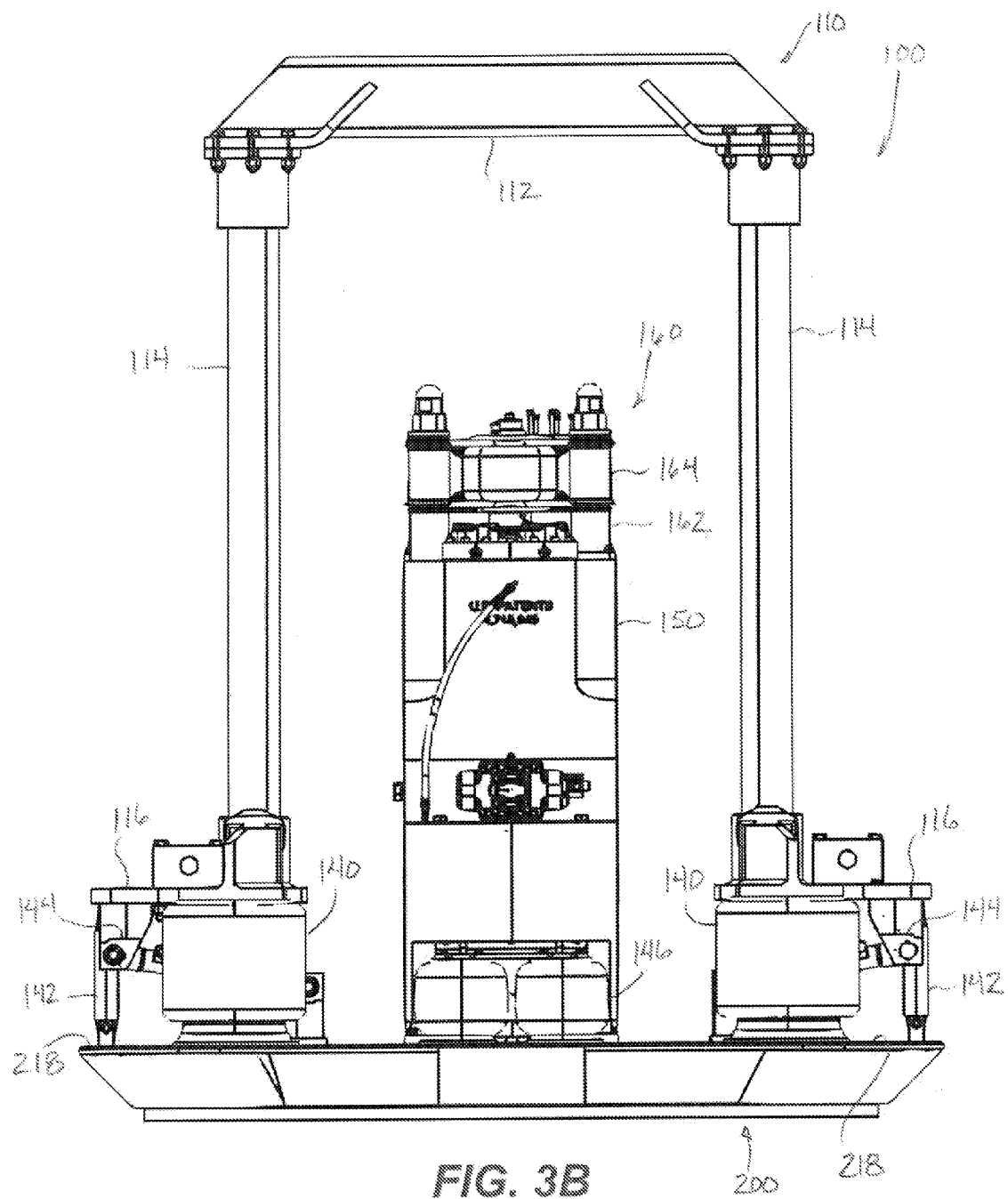
Figure 3C:
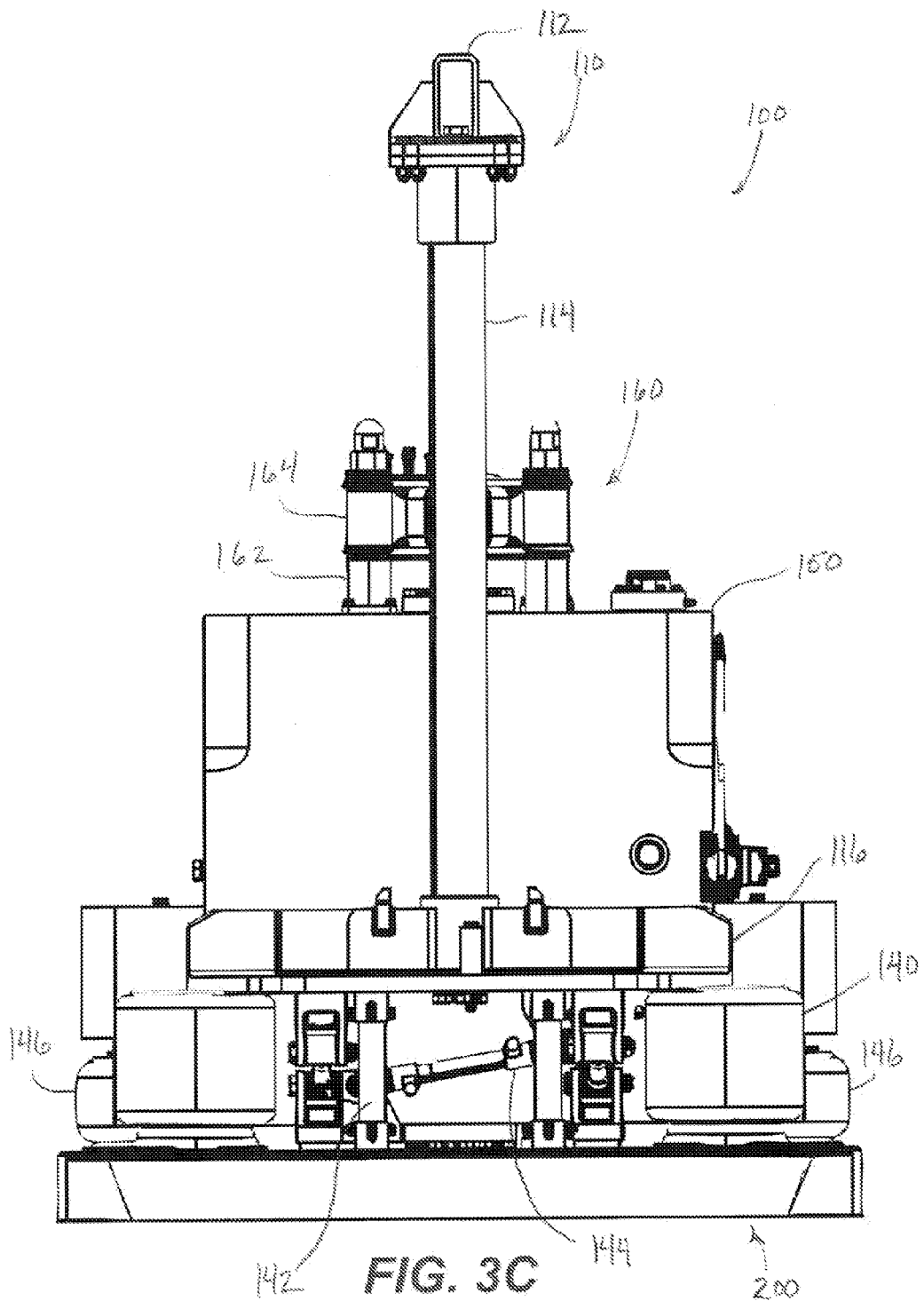
Figure 3D:
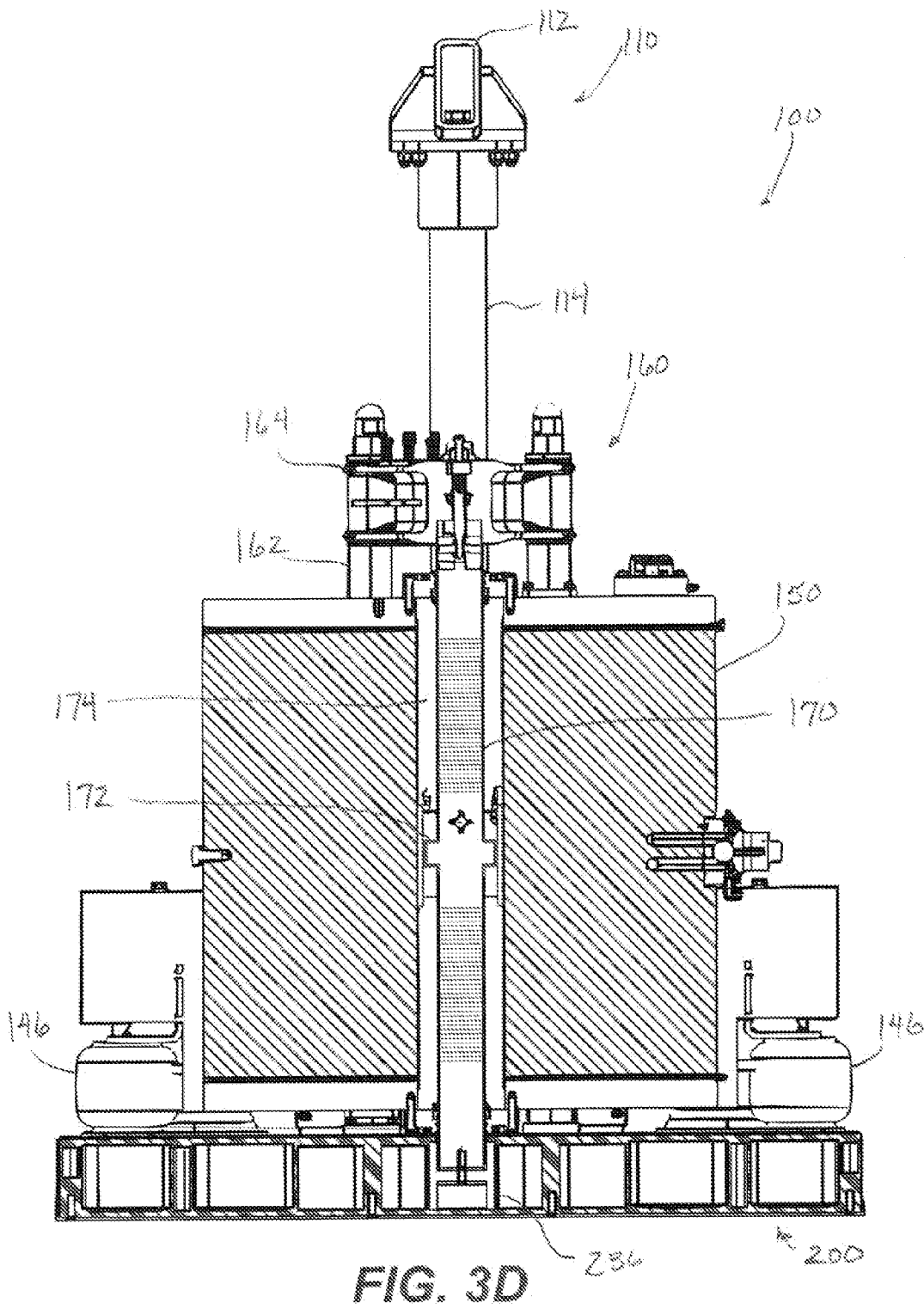

As best shown in FIG. 3D, the reaction mass 150 has a cylinder 176 internally therein that fits onto a vertically extending piston 170. The piston 170 connects at its lower end to a piston journal 236 in the baseplate 200 and extends upward through the cylinder 176. The piston's upper end connects to the upper cross piece 164. A head 172 on the piston 170 divides the cylinder 176 into upper and lower chambers. This piston 170 and reaction mass 150 can be hydraulically actuated according to techniques known in the art so that they are not detailed herein.

B. Baseplate

With an understanding of the vibrator 100, discussion now turns to further details of the baseplate 200. FIGS. 4A-4D show the baseplate 200 of the disclosed vibrator 100 in perspective, perspective, longitudinal cross-section, and lateral cross-section. The baseplate 200 has a top plate 210, a bottom assembly 220, and an internal composite core body 250. Most of the baseplate 200 is composed of metal, such as steel or the like, including the top plate 210 and the bottom assembly 220. However, the internal composite core body 250 is composed of a composite material, preferably having carbon fiber, although any suitable type of composite can be used. In general, the composite can be non-metallic and can have a matrix material (e.g., resin, polymer, etc.) and a reinforcement material (e.g., fiber strand, fiber mesh, or ground material) that meet the needs of the particular implementation. The choice of these materials and their ratio can be selected for strength and other factors.

The top plate 210 fits on top of the composite core body 250 and acts as a surface for the various couplings of the baseplate 200 to other components of the vibrator (100). The bottom assembly 220 also fits around the composite core body 250 and acts as the interface of the baseplate 200 with the ground during operation. The bottom assembly 220 has a central mount 230, a bottom plate 240, and skin elements 222.

Figure 8:
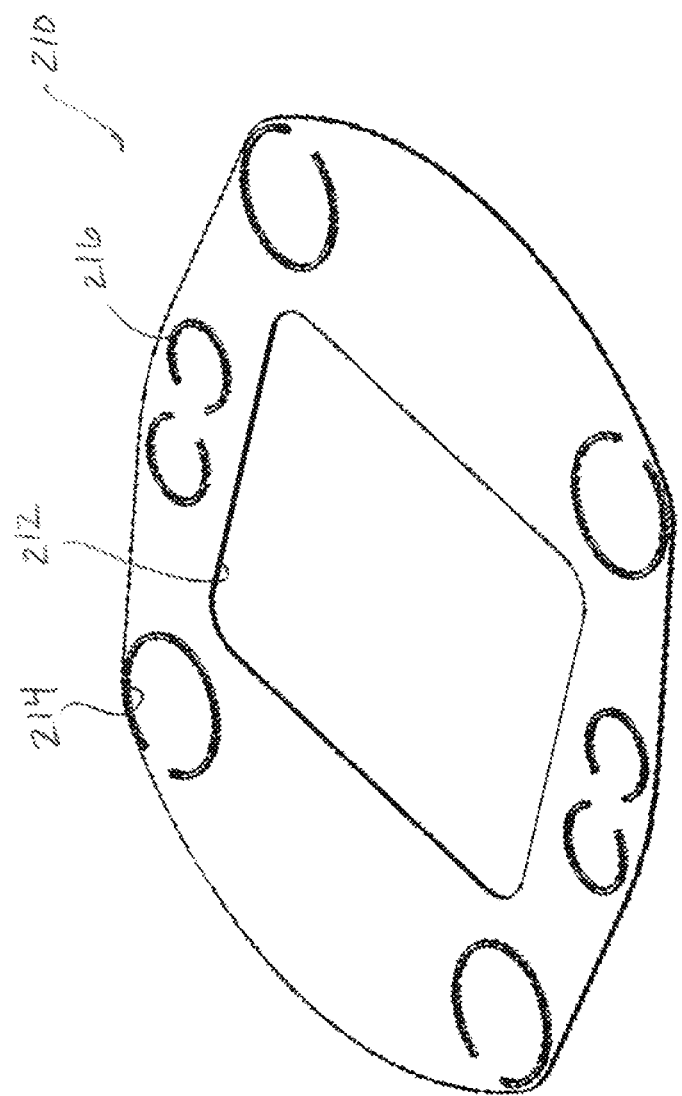
FIG. 8 shows the top plate of the disclosed baseplate in an upper perspective view.

The top plate 210, which is shown in an isolated perspective view in FIG. 8, is preferably composed of steel and defines a central opening 212 and various features on its surface. Corners of the top plate 210 extend out from the sides of the baseplate 200 and have retaining ledges 214 for the isolators (140). The top plate 210 has reinforcement pads 217 for connecting the pistons (144) near the outside edges the plate 210. In addition, the shorter edges of the top plate 210 can have forked hangers (not shown) to which ends of the tension members (142) connect. Other retaining ledges 216 are provided for the isolators (146) that fit below the reaction mass (150).

As shown in each of FIGS. 4A-4D, the baseplate's central mount 230 is exposed in the central opening 212 of the top plate 210. The central mount 230 has a central piston journal 236 for connection to the end of the vibrator's piston (170). (FIG. 10A shows a detailed cross-section of the piston journal 236.) The piston journal 236 fits in a central opening of the mount 230, and the end of the piston (170) affixes in the piston journal 236 with fasteners. In this way, force applied to the piston (170) couples to the mount 230 and the composite core body 250 of the baseplate 200 during operation of the vibrator (100).

Figure 4A:
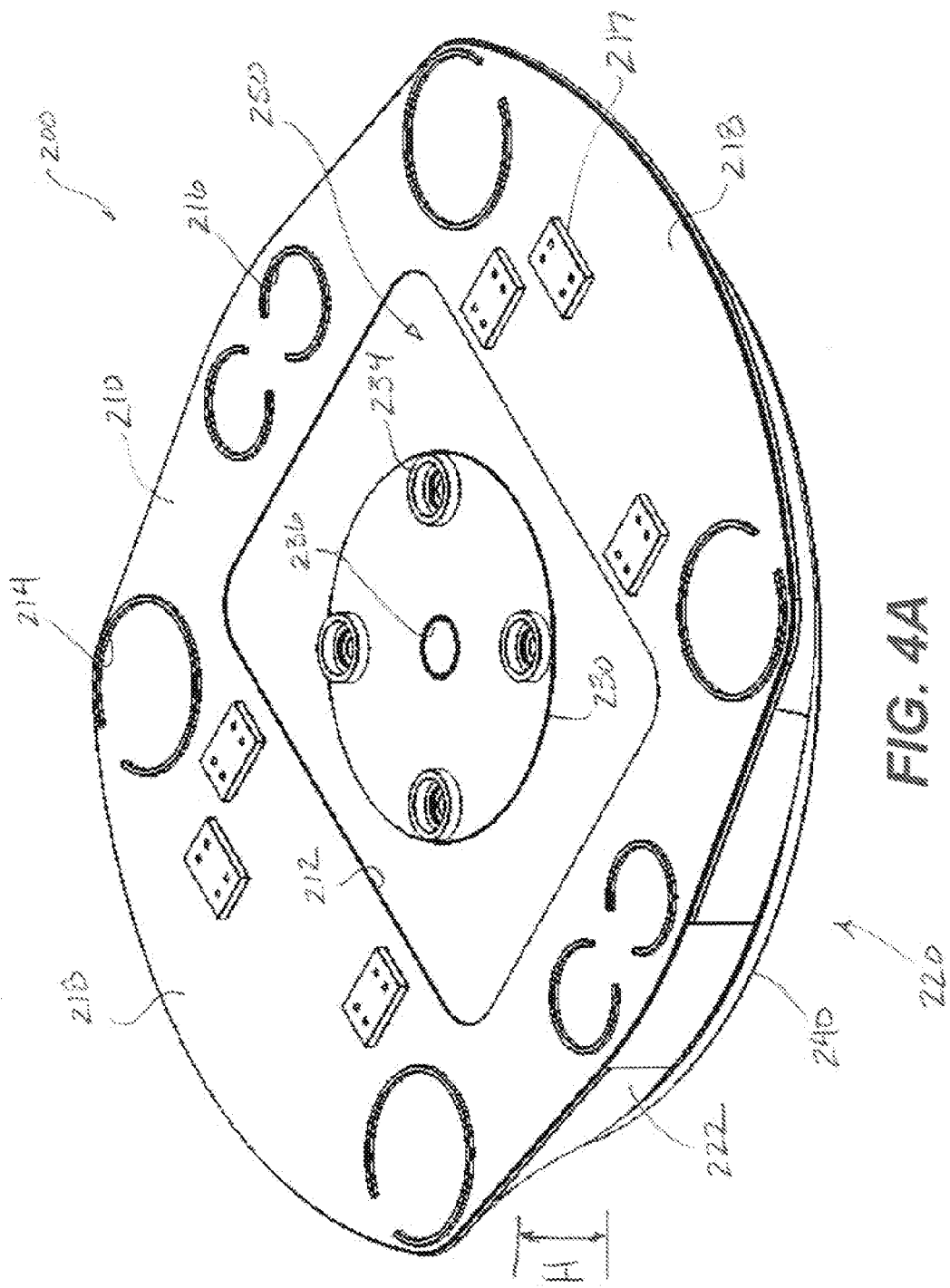
FIGS. 4A-4D show the baseplate of the disclosed vibrator in perspective, perspective cross-sectional, longitudinal cross-sectional, and lateral cross-sectional views.
Figure 4B:
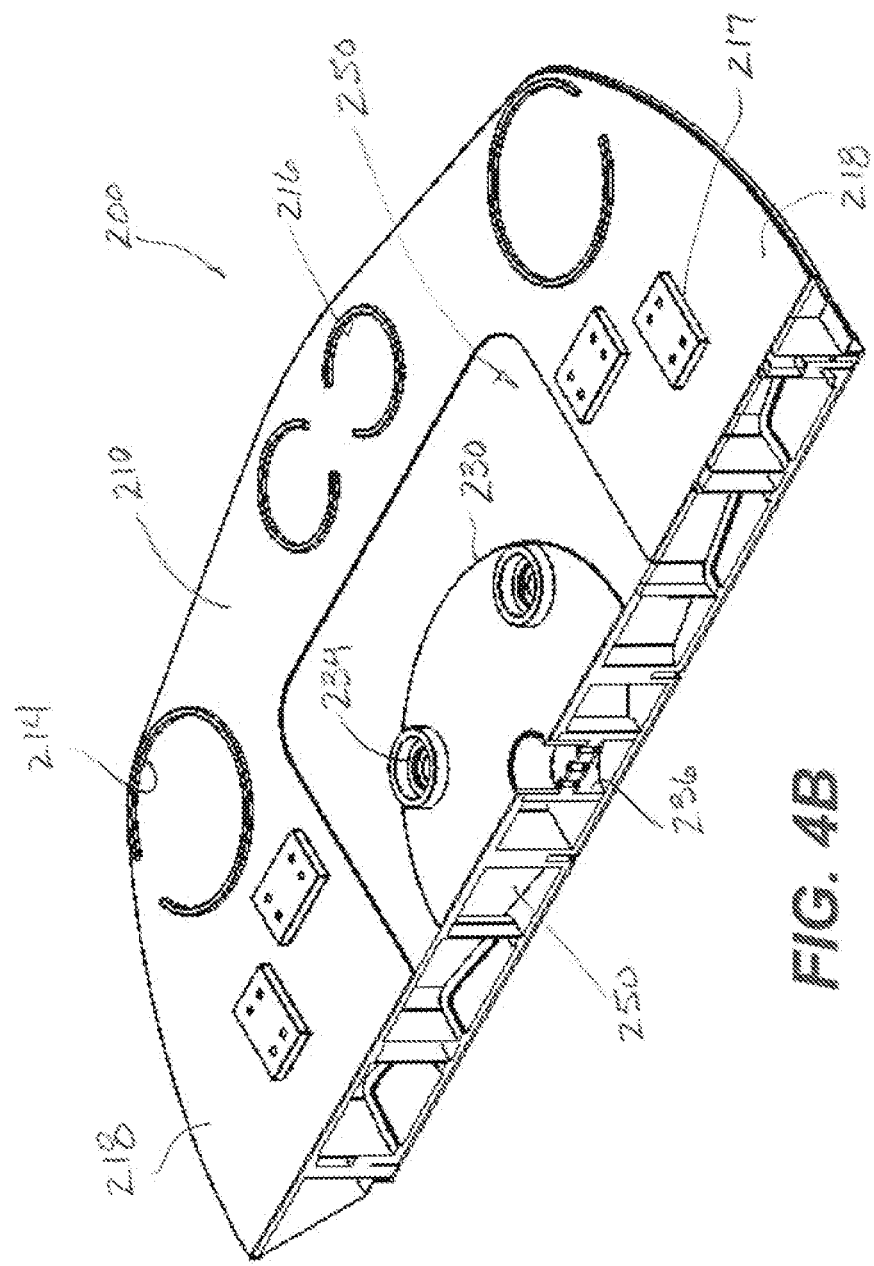
Figure 7A:
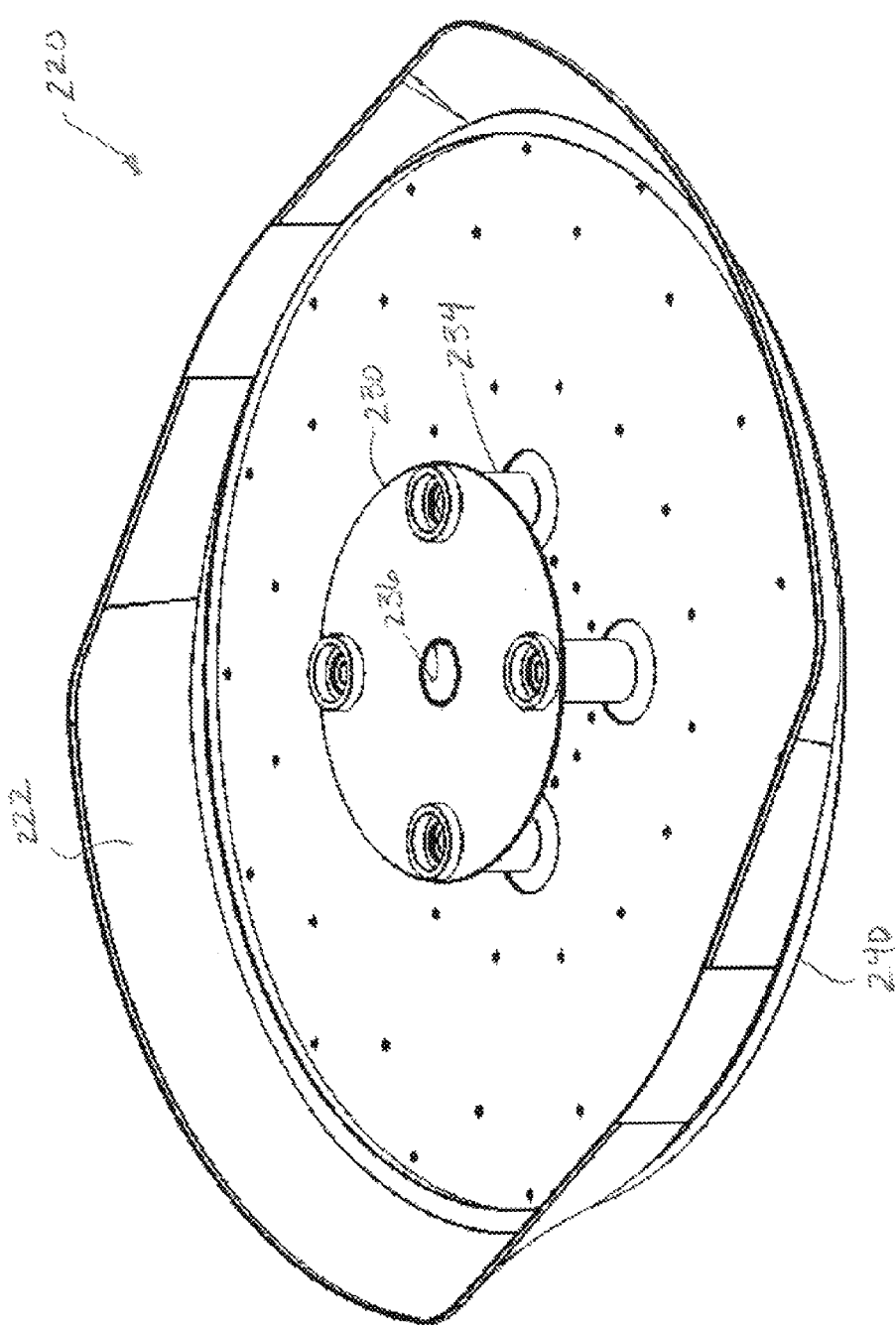
FIGS. 7A-7B show the bottom assembly of the disclosed baseplate in top and bottom perspective views.
Figure 7B:
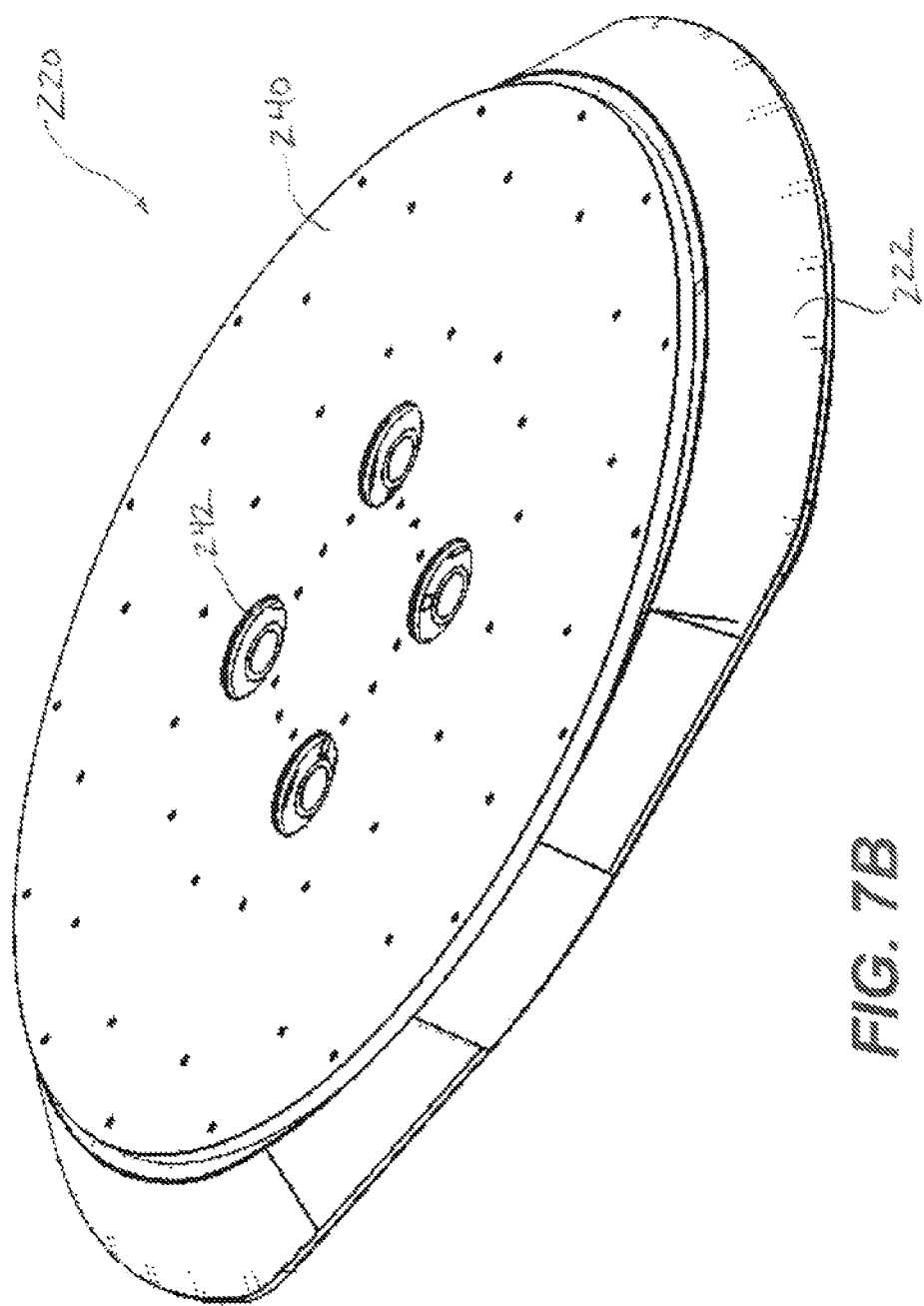

As best shown in FIG. 4A, around this piston journal 236, the central mount 230 has stilt journals 234 for connection to the ends of the vibrator's stilts (162). As best shown in FIG. 7A, the stilt journals 234 extend to the bottom plate 240 of the bottom assembly 220. (FIG. 10B shows a detailed cross-sectional view of one of the stilt journals 234.) Ends of the stilts (162) affix in these journals 234 to be supported to the baseplate 200.

Figure 4C:
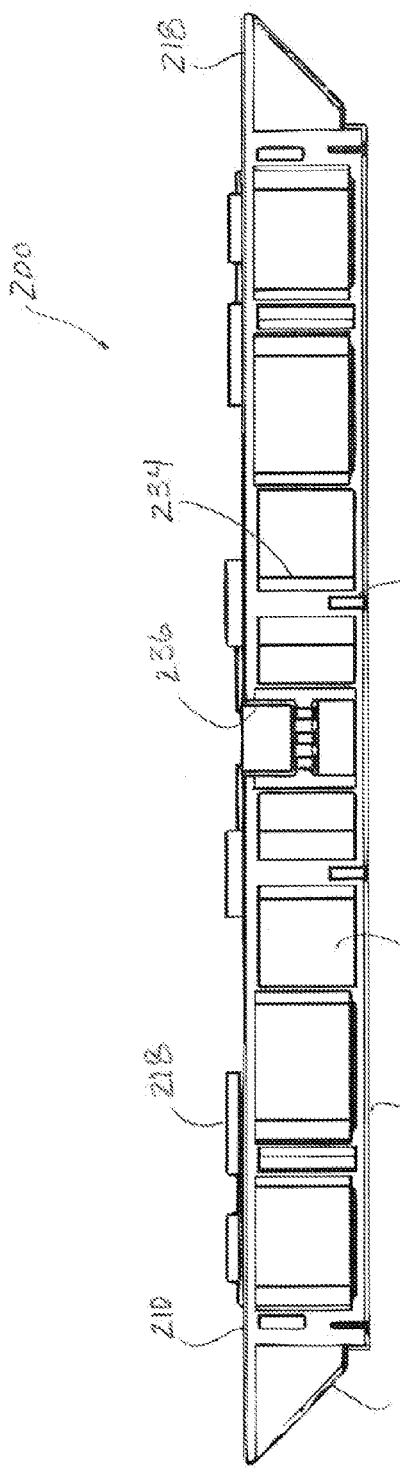
Figure 4D:
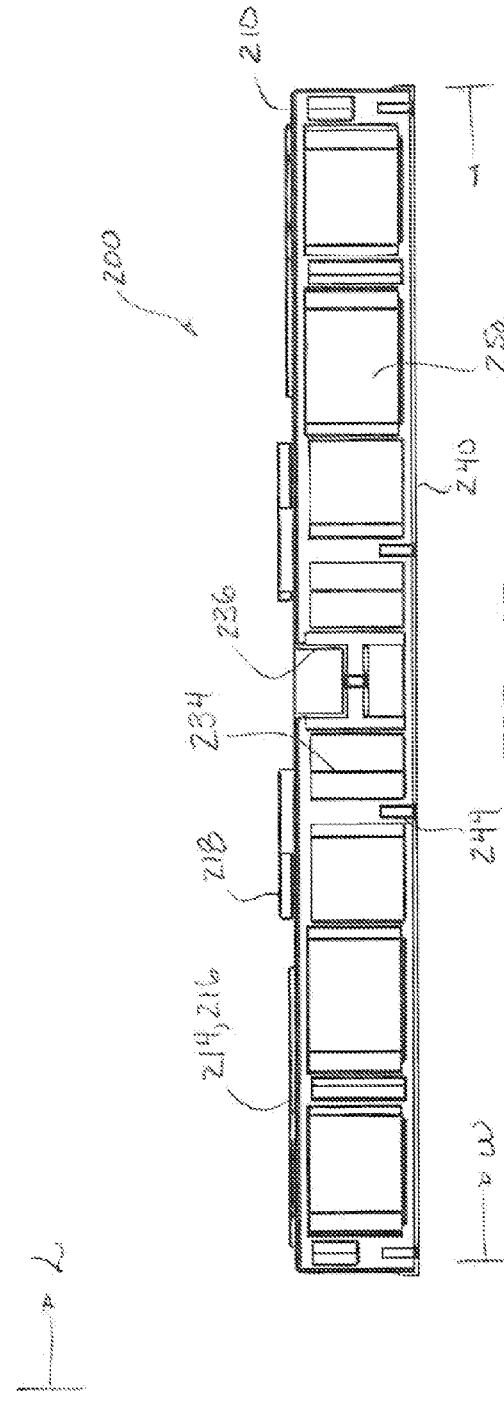

For its part, the bottom plate 240 as shown in FIGS. 4C-4D of the bottom assembly 220 fits below the composite core body 250 and can affix thereto using fasteners and other means. (An isolated perspective view of the bottom plate 240 is provided in FIG. 9.) Openings 242 in the bottom plate 240 are provided for attaching to the stilt journals 234. The skin elements 222 fit around the sides of the composite core body 250 and can act as protection in general.

If given an overall rectangular configuration, the baseplate 200 can have a width W of about 42-in. and a length L of about 92-in., giving a surface area of about 3864-sq in. A circular shape for the baseplate 200 may have dimensions for a comparable area. Additionally, the baseplate 200 can have a height H of about 12-in. and can weigh approximately 2500-lbs. in one implementation. Thus, the baseplate 200 can have a weight approximately 38% less than the weight of the conventional prior art baseplate. Yet, the baseplate 200 can have a much greater stiffness (almost 4 times greater) than a conventional baseplate as detailed below. However, these dimensions are only exemplary, and the disclosed baseplate 200 can have other dimensions depending on the implementation.

C. Composite Body

Figure 5A:
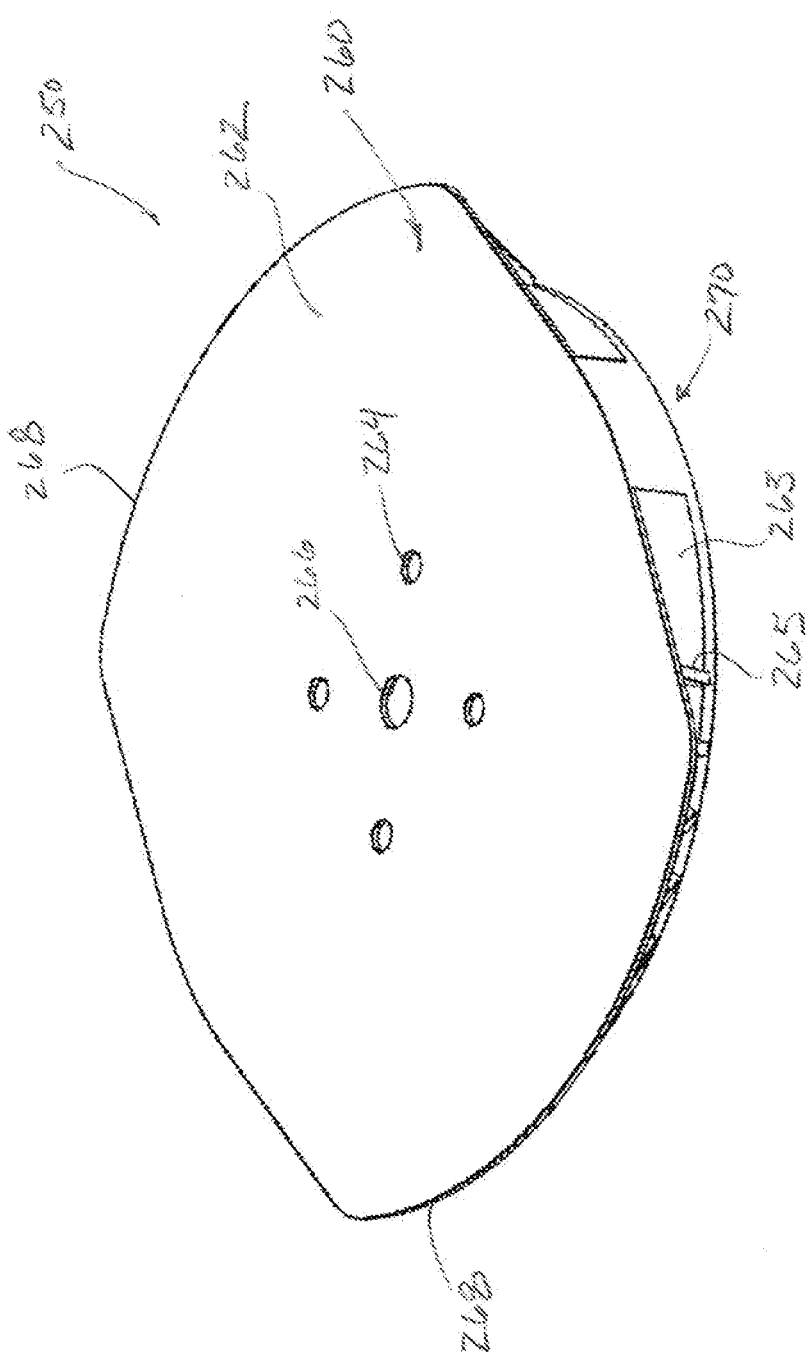
FIGS. 5A-5B show the composite body of the disclosed baseplate in a perspective top view and in a bottom view.
Figure 5B:
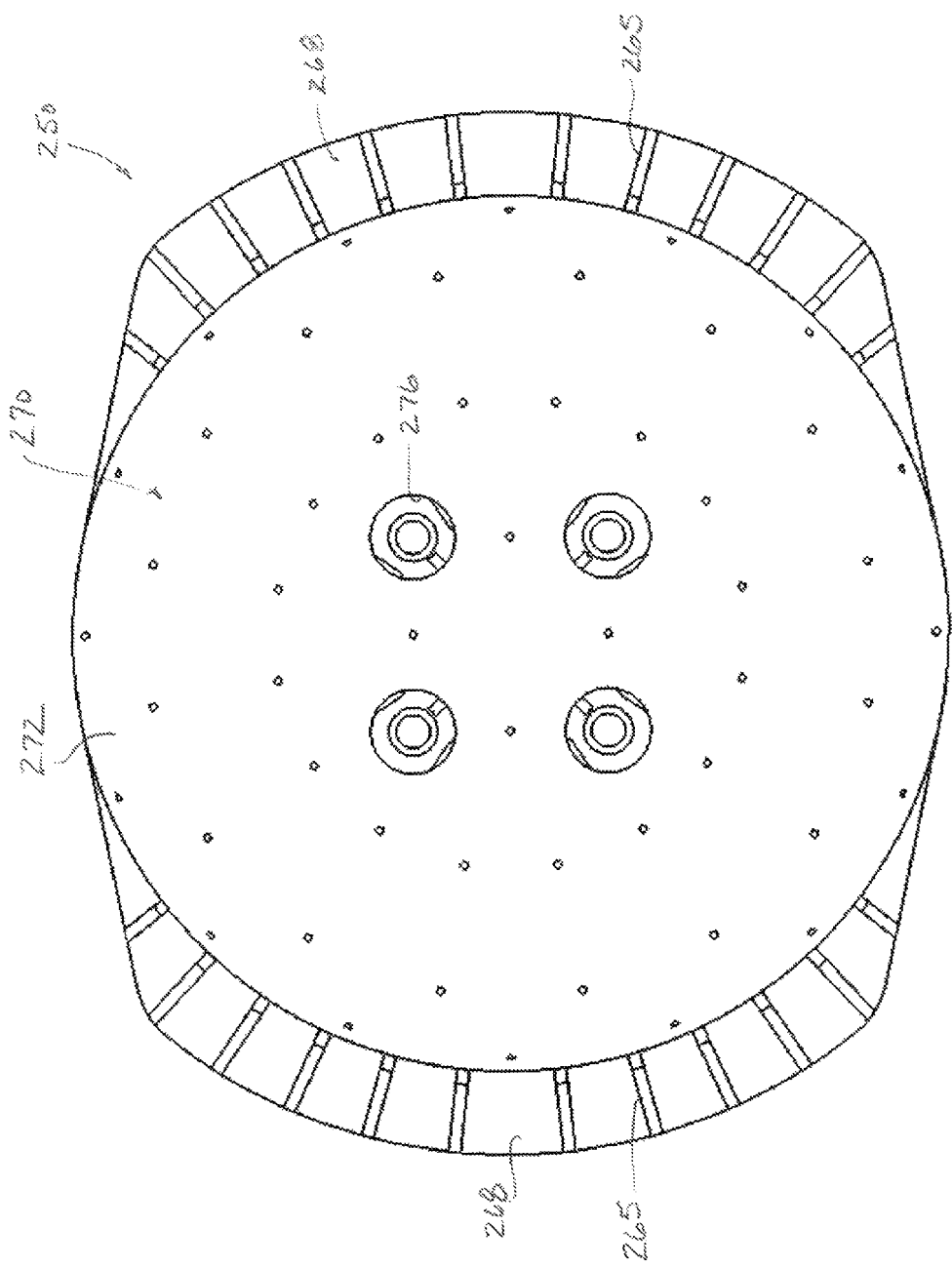

FIGS. 5A-5B show the composite core body 250 of the disclosed baseplate (200) in perspective and bottom views. As noted above, the composite core body 250 is composed of a composite material. Various types of materials can be used. Preferably, the core body 250 is composed of a carbon fiber material. The resin used, the type of weave, the strength to weight ratio, and other parameters for the carbon fiber material can be configured for a particular implementation and depend on the particulars of the carbon fiber manufacturing technology employed. The carbon fiber composite material for the core body 250 can withstand compression well, which is suitable for the vibrator's vibrating motion of imparting force into the ground. The carbon fiber material may not handle shear or friction forces very well so that the construction of the baseplate 200 and the core body 250 seek to mitigate such issues.

As shown in FIG. 5A, the core body 250 has a top surface component 260 and a bottom surface component 270 that are preferably separately formed and then joined together during assembly. In one embodiment, both components 260/270 are composed of composite material, such as having carbon fiber. Alternatively, one of the components 260/270, such as top component 260, can be composed of a different material, including another composite or even metal.

The top surface component 260 has a smooth face 262 against which the top plate (210) positions. The top plate (210) can simply rest against or can affix to the smooth face 262 using an appropriate fastening mechanism, such as epoxy, fasteners, or the like. A central opening 266 is provided for the central piston journal (236), and surrounding openings 264 are provided for the stilt journals (234). Opposing edges of the top surface component 260 form shelves 268 for extending the top surface of the baseplate 200 beyond its footprint as described previously. Gussets 265 can extend down from the face 262 to sidewalls 263 to which the face 262 is connected.

The bottom surface component 270 defines a circumference and has a bottom face 272 as shown in FIG. 5B to which the baseplate's bottom plate (240) affixes for imparting force into the ground. As discussed herein, having a round interface can be beneficial in supporting the reaction mass (150) and handling bending and shear stresses with the baseplate 200, among other benefits.

Figure 6A:
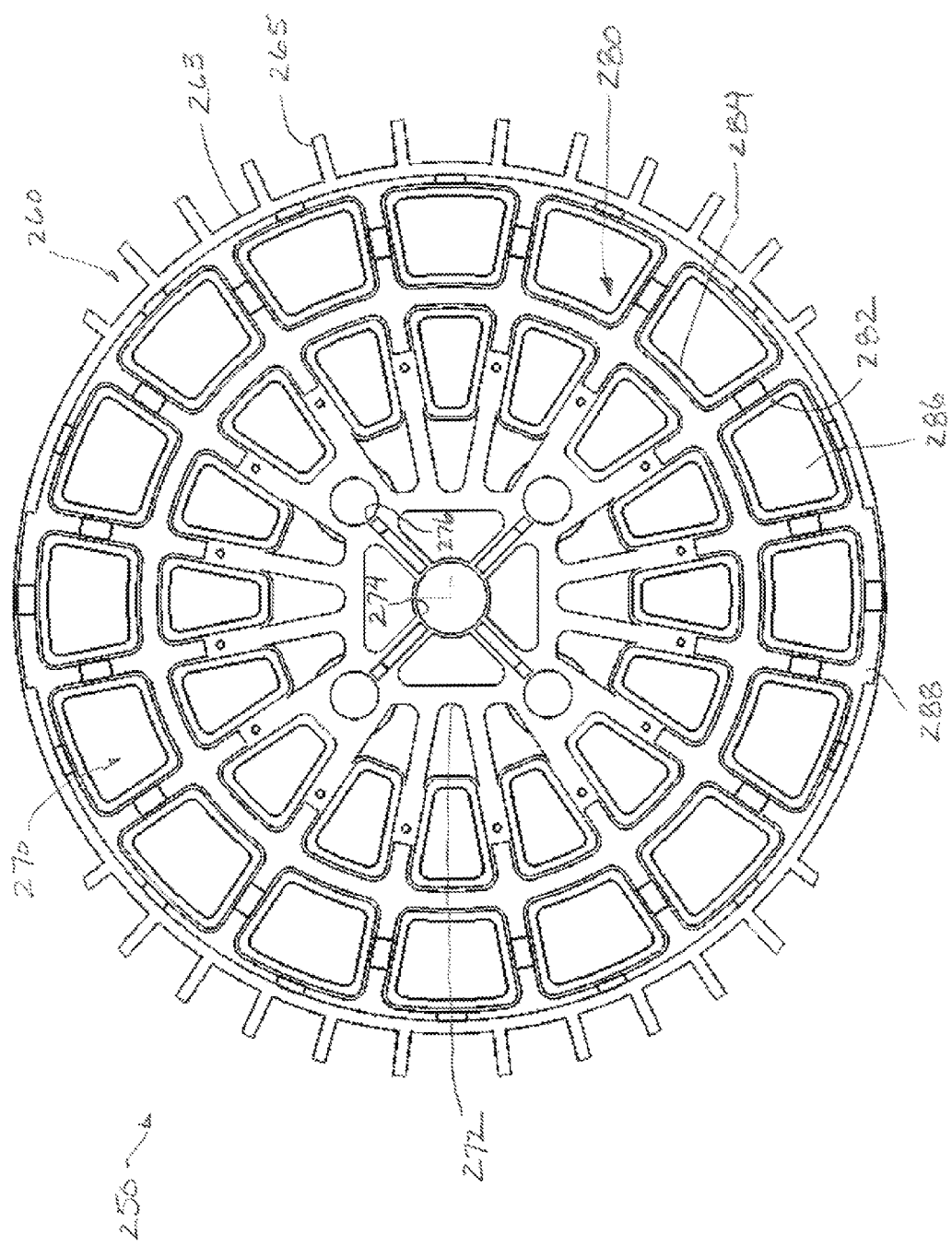
FIGS. 6A-6B show the composite body of the disclosed baseplate in a top cross-sectional view and in a bottom cross-sectional view.
Figure 6B:
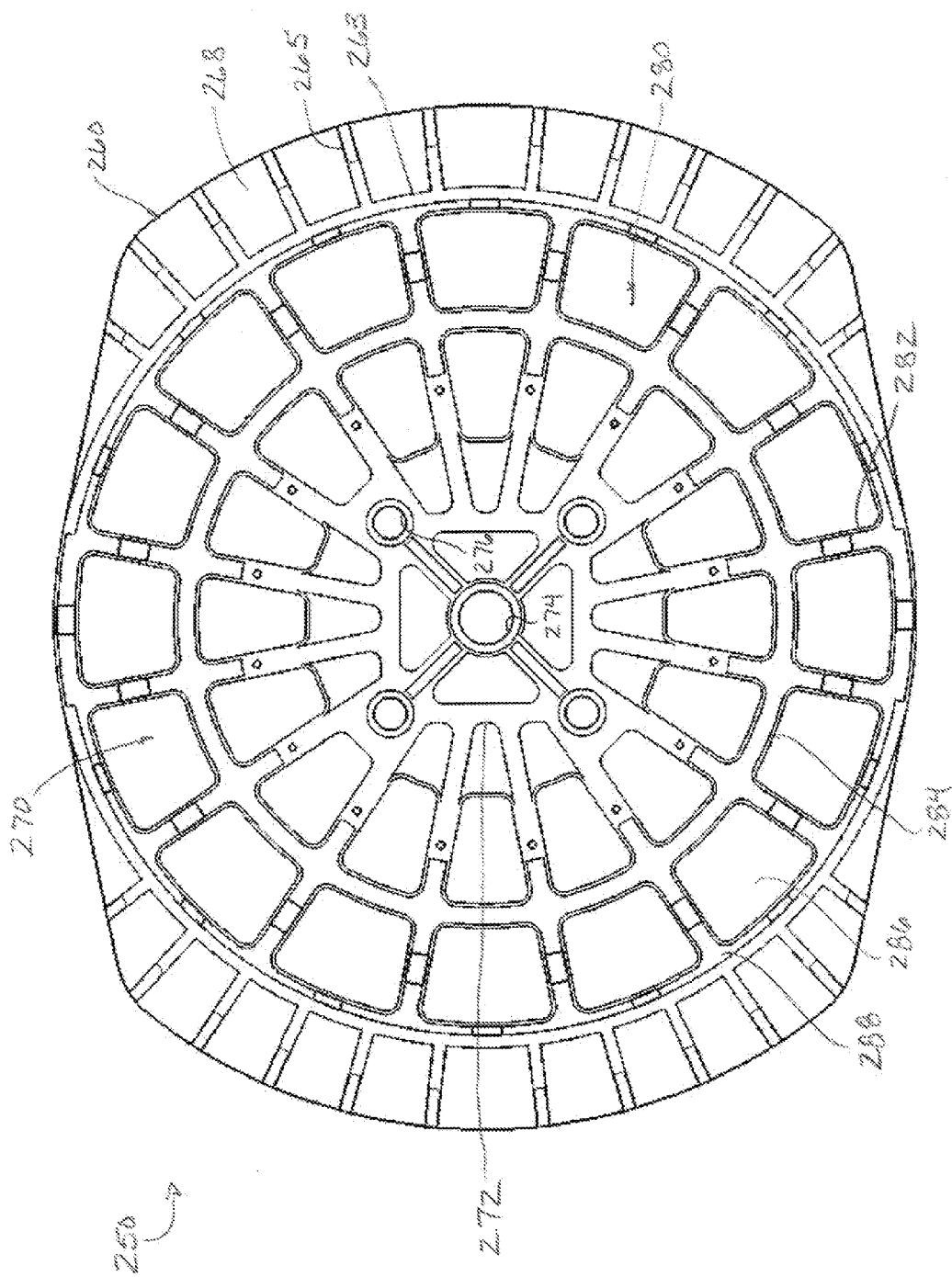

The internal structure of the core body 250 is illustrated in the top and bottom cross-sectional views of FIGS. 6A-6B respectively. As noted previously, the top surface component 260 has the sidewall 263 as shown in FIG. 6A. The sidewall 263 fits around portion of the bottom surface component 270 when joined together. The gussets 265 extend from opposing ends of the sidewall 263 for supporting to the top face 262 of the top surface component 260.

The bottom surface component 270 has a central structure 272 with openings 274 and 276 for the stilt journals (234) and the piston journal (236). A lattice structure 280 extends around this central structure 272 and includes main or radial ribs 282 interconnected by circumferential or interconnecting ribs 284 and defining pockets 286. This lattice structure 280 increases the stiffness of the core body 250 and inhibits transverse bending.

As shown, the lattice structure 280 is preferably round so that the main ribs 282 extend radially and the interconnecting ribs 284 extend circumferentially. If the baseplate 200 has a different shape, such as rectangular, then the main ribs 282 may extend longitudinally while the interconnecting ribs 284 extend laterally. These and other variations are possible depending on the overall shape of the baseplate 200.

D. Operation of Baseplate with Composite Body

Figure 2A:
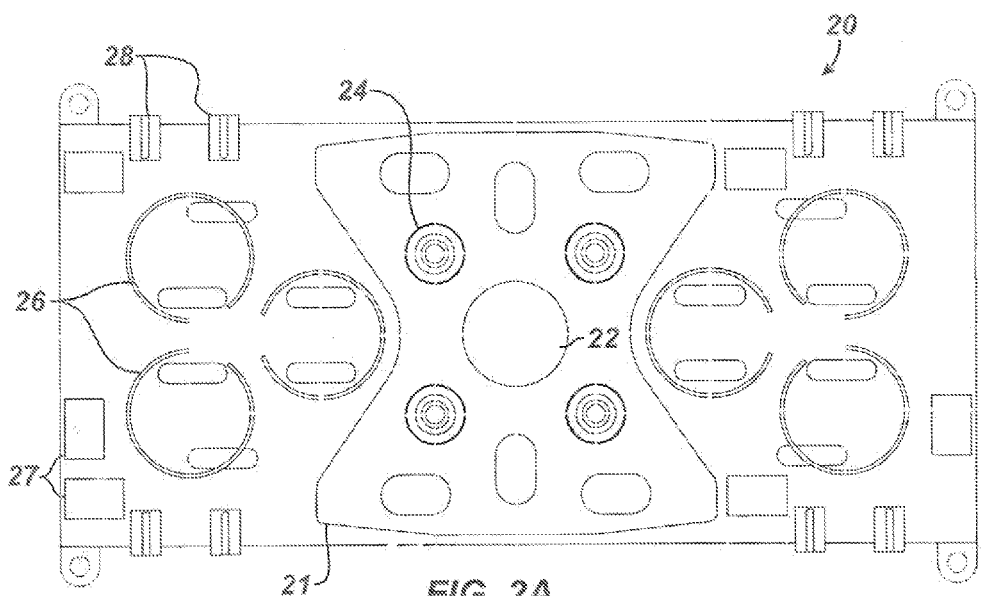
FIGS. 2A-2C illustrate the baseplate for the prior art vibrator in plan, side, and end-section views.
Figure 2B:
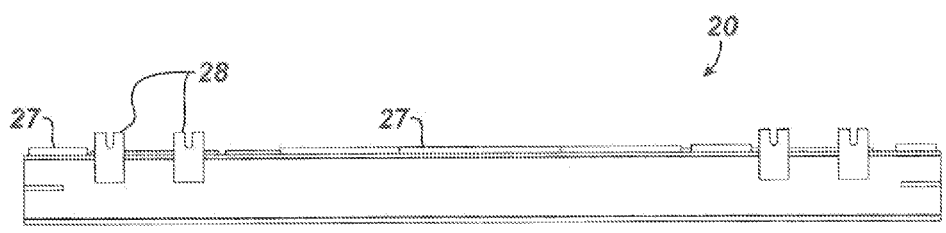
Figure 2C:
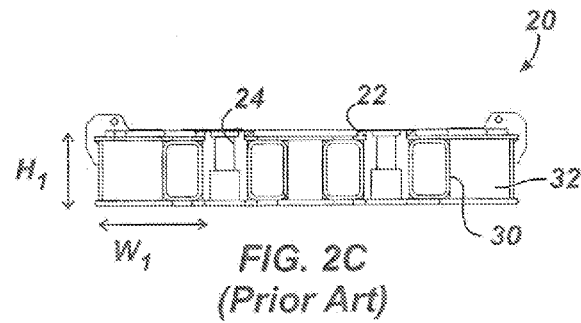

During operation, the contact area of a given baseplate changes between downward strokes and upward strokes. The typical prior art baseplate such as shown in FIGS. 2A-2C, which is rectangular, has downward forces on the ends as the piston provides the up and down force in the center. This movement tends to decouple the prior art baseplate from the ground, causing inefficient energy transmission.

Ideally, a baseplate used on a seismic source can uniformly distribute force imparted from the reaction mass to the ground. To assist with such uniformity, the disclosed baseplate 200 is substantially circular having a round footprint for engaging the ground. Being symmetric, the disclosed baseplate 200 can more evenly distribute the force and avoid some of the decoupling that reduces energy transmission.

The symmetric baseplate 200 can produce $2^{nd}$ and $4^{th}$ order harmonics. The stiffness of composite carbon fiber material of the core body 250 can help distribute the applied force for the ground force of the vibrator (100). Additionally, using of the composite core body 250 in the baseplate 200 can reduce the $2^{nd}$ order harmonics due to the more even distribution of force with the up and down strokes of the vibrator (100). Moreover, the vibrator (100) can require less energy for operation because the vibrator signal will experience less attenuation.

Other properties of the disclose baseplate 200 help improve its transmissive properties. In general, the Young's modulus, stiffness, strength, and low density of the composite core body 250 contribute to improved transmissive properties of the baseplate 200. In particular, a structural design preferably has a higher resonant frequency relative to any vibration to which the structure is subjected. In general, the resonant frequency for a structural design can be described by the equation:

$$\omega_n = \sqrt{\frac{K}{M}}$$

In the context of the vibrator (100) and the baseplate 200 of interest, the resonant frequency can be described by the equation:

$$\omega_n = \sqrt{\frac{K}{M_{bp}}}$$

Here, K is the coupling stiffness of the baseplate 200 to the ground, and $M_{bp}$ is the mass of the baseplate 200. The mass $M_{bp}$ of the baseplate 200 can be known, and the value for the coupling stiffness K is governed by the Young's modulus and shape geometry of the baseplate 200, which can be defined.

In the operation of the baseplate 200, the resonant frequency would normally limit the bandwidth achievable with the baseplate 200 during use. Thus, the baseplate 200 with a higher resonant frequency would be capable of greater bandwidth than conventionally achieved. According to the resonant frequency equation for the structural design noted above, reduction of the baseplate's mass $M_{bp}$ can increase the resonant frequency as generally desired. Because the composite core body 250 is composed of composite carbon fiber material, which can have almost ¼ of the density of steel typically used, the disclosed baseplate 200 can have improved transmissive properties and greater achievable bandwidth due to its higher resonant frequency.

E. Alternative Baseplate

Figure 11A:
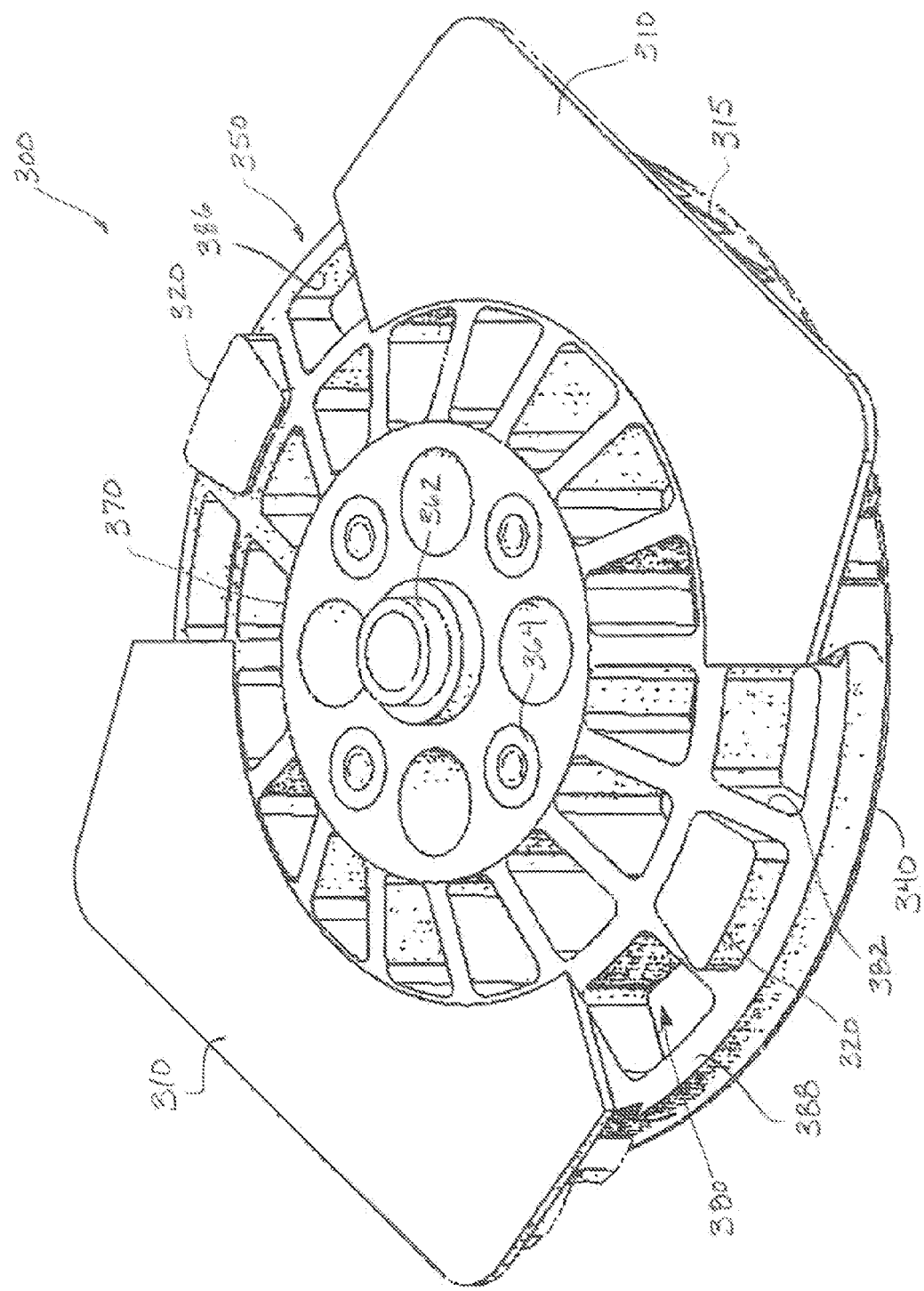

FIGS. 11A-11B show another baseplate 300 according to the present disclosure. The baseplate 300 has a composite body 350, shelves 310, stands 320, and a bottom plate 340. Again, the composite body 350 is composed of a composite material. Although various types of materials can be used, the body 350 is again preferably composed of a carbon fiber material.

The composite body 350, which is shown in isolated view in FIG. 11B, has a central hub 370 defining a central opening for a piston journal 362. Surrounding openings hold stilt journals 364. Extending out from the central hub 370, the body 350 has a lattice structure 380 having radial ribs 382 and circumferential ribs 384 interconnecting them and defining pockets 386. The outside circumference of the body 350 has an outer rim 388.

As shown in FIG. 11A, the bottom plate 340 affixes to the bottom of the body 350. The bottom plate 340 can be composed of metal or the like and can attach to the flat bottom of the body 350 with fasteners or the like. The top of the body 350 can slope downward from the central hub 370 to the rim 388.

As shown in FIG. 11A, affixed on two ends of the rim 388 are shelves 310 for supporting the isolators (140), shock absorbers (142), and tension members (144) of the vibrator (100), which are not shown but are described earlier. Gussets 315 can support the shelves 310 on sidewalls affixed to the body's rim 388. The shelves 310 and gussets 315 can be composed of composite material and can affix to the composite body using techniques available in the art. Alternatively, the shelves 310 and gussets 315 can be composed of metal.

Offset from the shelves 310, two stands 320 fit in pockets 376 of the body's lattice 380. These stands 320 accommodate the isolators (146) for the reaction mass (150), which are not shown but are described earlier. To enclose the composite body 350 and other elements, the outside of the baseplate 200 can have various skin elements (not shown).

Although the disclosed vibrator 100 of FIGS. 3A-3D has been described as having a hydraulically actuated reaction mass 150, those skilled in the art will appreciate that the teachings of the present disclosure can be applied to other types of actuators for reciprocating a reaction mass. In general, therefore, the disclosed vibrator 100 can reciprocate a reaction mass 150 using a linear induction motor, a linear synchronous motor, a controlled hydraulic actuator, or any other actuator used in the art. Either way, the vibrator 100 can use any type of actuator to impart energy into the ground with the disclosed baseplate 200.

In addition to vibrating vertically to impart compression waves ("P-Waves"), the disclosed vibrator 100 can also produce seismic shear waves ("S-Waves"). Moreover, the present disclosure has focused on a single axis seismic source for brevity and without limiting the scope of the disclosure. Those skilled in the art would recognize that a multi-axis vibratory source capable of imparting both P and S waves into the earth can be configured according to the present disclosure. Details related to coupling the disclosed vibrator 100 to the ground and details related to other actuators for the disclosed vibrator 100 can be found in U.S. Pat. Pub. Nos. 2007/0250269, 2007/0240930, and 2009/0073807, which are incorporated herein by reference.

Although the baseplate 200/300 with the composite body 250/350 is described as being circular or round, it will be appreciated with the benefit of the present disclosure that a comparable structure of the disclosed baseplate 200/300 can be applied to a square, rectangular, polygonal, or other shape for a vibrator's baseplate according to the present disclosure. For example, the teachings of the present disclosure with respect to the internal composite body 250 of FIGS. 5A through 6B can be applied to a rectangular or other shaped baseplate for a vibrator.

Figure 12A:
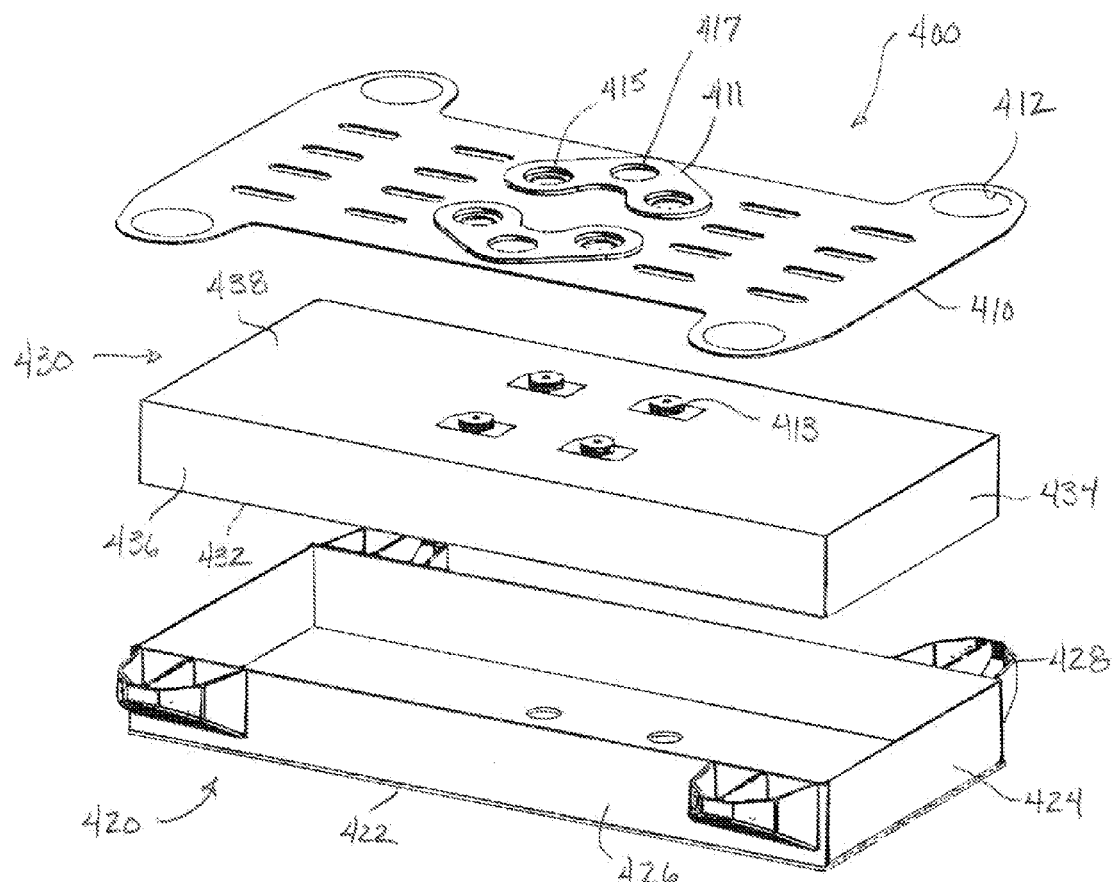
FIGS. 12A-12B show an exploded view and an exposed view of another partially composite baseplate according to the present disclosure.
Figure 12B:
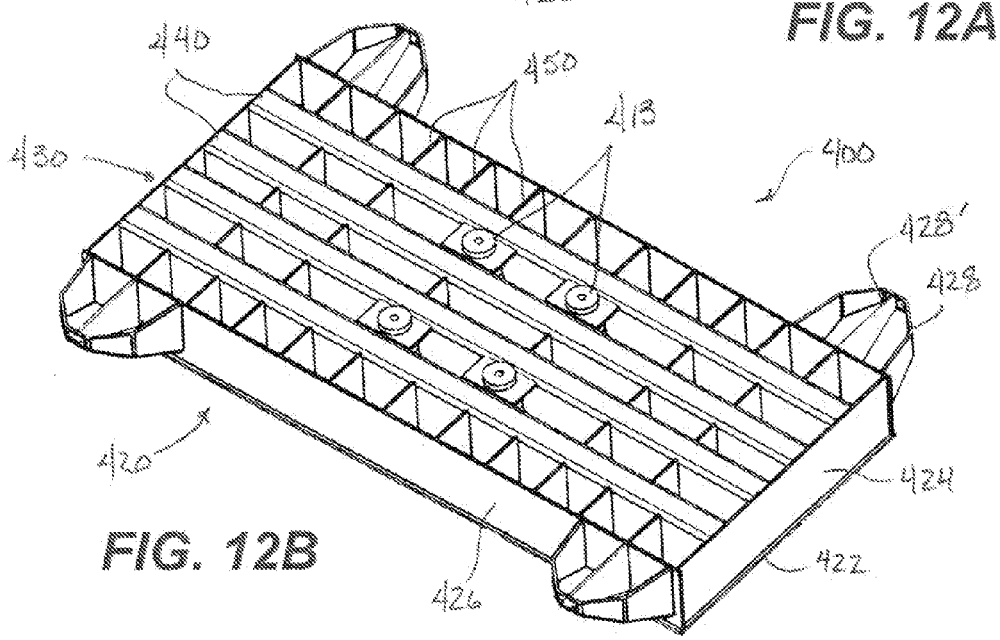

As another example, a baseplate according to the present disclosure can have a shape and components similar to the conventional baseplate 20 of FIGS. 2A-2C. As shown in FIGS. 12A-12B, for example, another composite baseplate 400 is shown in exploded and exposed views. The overall shape of this baseplate 400 is similar to that disclosed in U.S. Pat. Pub. No. 2010/0276224, which is incorporated herein by reference in its entirety.

Figure 12C:
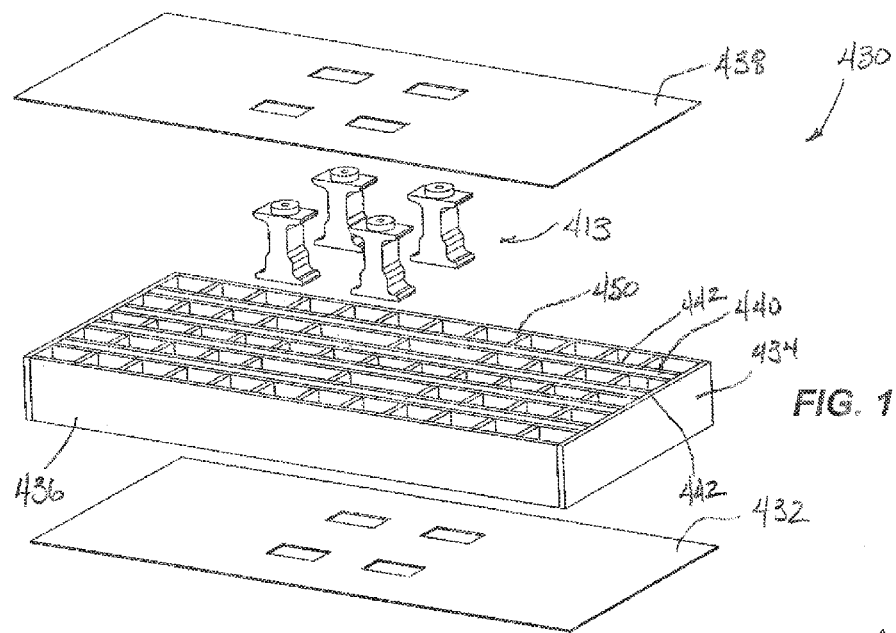
FIG. 12C shows an exploded view of the core body of the composite baseplate.
Figure 12D:
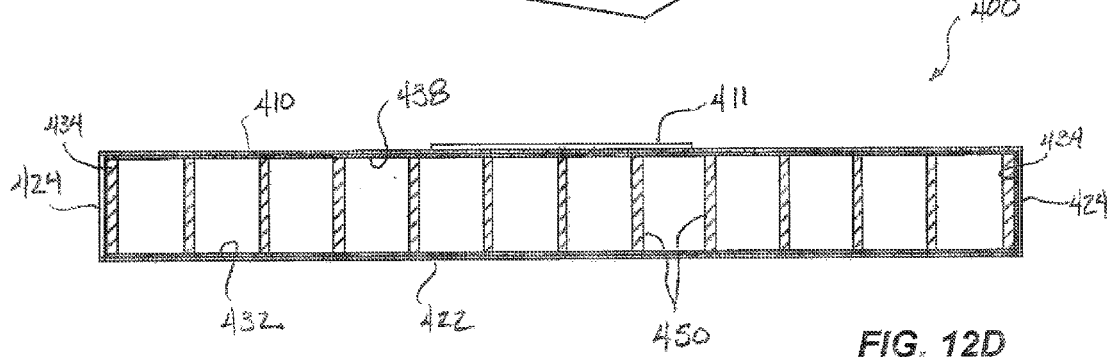
FIGS. 12D-12E show longitudinal and lateral sectional views of the composite baseplate.
Figure 12E:
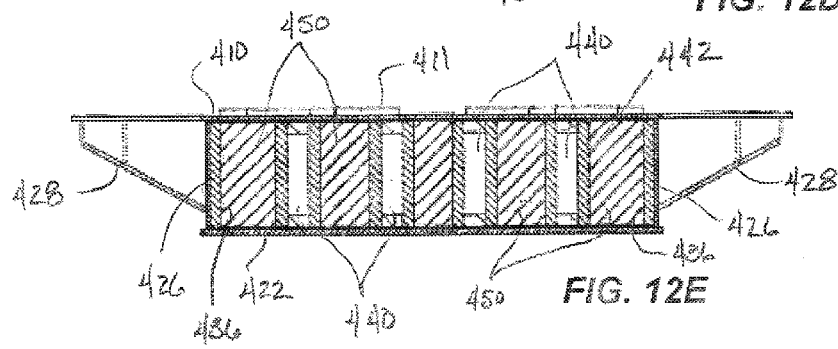

The baseplate 400 has a top plate 410, a bottom assembly 420, and a core body 430. The core body 430 fits into the bottom assembly 420, and the top plate 410 disposes on the core body 430 to form the baseplate 400. FIG. 12C shows an exploded view of the core body 430 of the composite baseplate 400. FIGS. 12D-12E show longitudinal and lateral sectional view of the composite baseplate.

Looking at the top plate 410, the top plate 410 defines various openings for flexibility and has reinforcement pads 411 with stilt mount holes 415 and isolator mount recesses 417. The mount holes 415 allow the stilts (not shown) of a vibrator to couple to stilt mounts 413 disposed in the core body 430. The mount recesses 417 hold isolators (not shown) for the vibrator's reaction mass (not shown). Corners of the top plate 410 extend out from the sides of the baseplate 400 and have retaining ledges 412 for the additional isolators (not shown) of the vibrator's frame (not shown). Finally, the top plate 410 can have other features, such as hangers (not shown) for tension members (not shown) and reinforcement pads (not shown) for pistons (not shown) typically used.

As best shown in FIG. 12A, the bottom assembly 420 has a bottom plate 422 with end walls 424 and long sidewalls 426 extending upward around the plate's edges. Isolator shelves 428 and gussets 428' extend from the bottom assembly's long sidewalls 426 and support the top surface's extending corners for the isolators (not shown). Lower ends of the mounts 413 can fit in holes in the bottom plate 422.

For its part, the core body 430 best shown in FIG. 12C can have bottom, side, end, and top exterior sheeting 432, 434, 436, and 438 to hold together the core body's internal components. One or more elements of exterior sheeting may not be needed. The stilt mounts 413 fit in openings in the bottom exterior sheeting or shear panel 432. The mounts 413 are also exposed above the top exterior sheeting or shear panel 438 and align with the mount holes 415 in the top plate 410. The sheeting 434 and 436 can be stiffener beams providing stiffness to the core body 430.

Internally, as shown in FIGS. 12B-12E, the core body 430 has longitudinal ribs or beams 440 that run longitudinally along the baseplate's length. Four beams 440 are shown, but more or less could be used depending on the implementation. Interconnecting spacers or ribs 450 position laterally between the beams 440 and along the long cap walls 426 of the bottom assembly 420. The stilt mounts 413 position between inner pairs of the beams 440 at the central structure of the core body 430.

The beams 440 can be hollow or solid tubes with rectangular cross-sections, or the beams 440 can be I-beams or other components. As can be seen in FIGS. 12C and 12E, the beams 440 can be sandwiched between spacer strips or stiffeners 442. To provide increased stiffness, the beams 440 can have an increased height, but the particular height used depends on the stiffness desired and the material used. To maintain weight and stiffness for the beams 440 when hollow, the wall thickness of the beams 440 can be appropriately configured, and the actually thickness can depend on the desired stiffness and weight of the baseplate 400 as well as the material used for the beams 440.

Depending on the implementation, all or at least a part of the baseplate 400 can be composed of a composite material. For example, the longitudinal beams 440 can be composed of a composite material having carbon fiber or the like. The beams 440 may or may not be hollow in such an arrangement. The interconnecting ribs 450 positioned between the beams 440 can be composed of composite material or metal and can be separate or integrated into the beams 440. In fact, the entire core body 430 can be composed of composite material.

Additionally, the exterior sheeting 432, 434, 436, and 438 of the core body 430 can be composed of metal. Likewise, the top plate 410 and the bottom assembly 420 can be composed of metal. As will be appreciated with the benefit of the present disclosure, however, the beams 440 are preferably made of a composite material, whereas any of the other components (e.g., top plate 410, bottom assembly 420, ribs 450, mounts 413, etc.) can be composed of metal. Dimensions and weight of the baseplate 400 can be comparable to the dimensions and weight typically used on existing baseplates so the baseplate 400 can be roughly 10-inches high, 42-inches wide, and 96-inches long and may have a weight in excess of 4000-lbs. depending on the implementation.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims.

Therefore, it is intended that the appended claims include all modifications and alterations to the full extent that they come within the scope of the following claims or the equivalents thereof.

What is claimed is:

1. A seismic vibrator, comprising:
   a baseplate having a resonant frequency and comprising:
      a core body at least partially composed of a composite material;
      a bottom plate coupled to a bottom surface of the core body; and
      a top plate coupled to a top surface of the core body;
   a reaction mass movably disposed relative to the baseplate and configured for imparting vibrational energy thereto;
   an actuator coupled to the reaction mass and configured for moving the reaction mass relative to the baseplate for imparting the vibrational energy thereto; and
   a controller communicatively coupled to the actuator and configured to generate a drive signal for controlling operation of the actuator, wherein the baseplate vibrates at a desired amplitude and frequency to generate a seismic source signal for transmission through a ground surface;
   wherein the composite material is selected with stiffness and density such that the resonant frequency of the baseplate is higher than the desired frequency at which the baseplate vibrates when generating the seismic source signals.

2. The seismic vibrator of claim 1, wherein the composite material is non-metallic and comprises reinforcing carbon fibers in a resin or polymer matrix.

3. The seismic vibrator of claim 1, wherein the baseplate comprises:
   a frame configured for carrying the seismic vibrator;
   a bottom surface having a round perimeter defining a footprint of the seismic vibrator; and
   a top surface having a rectangular perimeter with shelves extending beyond the round perimeter of the bottom surface, the shelves configured to support isolators disposed between the baseplate and the frame, the isolators further situated outside the footprint.

4. The seismic vibrator of claim 1, wherein the top plate is composed of a metallic material having greater density than the composite material.

5. The seismic vibrator of claim 1, wherein the bottom plate comprises a metallic material having greater density than the composite material.

6. The seismic vibrator of claim 1, wherein the baseplate further comprises a plurality of walls extending around sides of the core body.

7. The seismic vibrator of claim 1, wherein the baseplate comprises:
   a top component comprising the top plate and having a top surface and an outer wall extending therefrom; and
   a bottom component comprising the bottom plate and having a bottom surface and an inner wall extending therefrom, wherein the top component is coupled to the bottom component with the outer wall fitting around the inner wall.

8. The seismic vibrator of claim 1, wherein the core body comprises:
   a central journal structure configured to couple to the mass; and
   a lattice structure surrounding the central journal structure, the lattice structure having main ribs extending from the central journal structure and interconnecting ribs interconnecting the main ribs.

9. The seismic vibrator of claim 8, wherein the core body is substantially round and the main ribs extend radially from the central journal structure, and wherein the interconnecting ribs extend circumferentially between the main ribs.

10. The seismic vibrator of claim 9, wherein a stiffness of the composite material of the core body together with the main ribs and the interconnecting ribs is selected to reduce second order harmonics in the baseplate and inhibit transverse bending of the baseplate during operation of the seismic vibrator to generate the seismic source signals.

11. The seismic vibrator of claim 1, wherein:
   a bottom portion of the baseplate is substantially round and defines a footprint of the seismic vibrator configured for engaging the ground surface; and
   a top portion of the baseplate is substantially not round and extends beyond the footprint.

12. A baseplate for a seismic vibrator, the baseplate comprising:
   a core body configured to be coupled to a reaction mass of the seismic vibrator, the core body composed of a composite material and comprising:
      a central structure configured to accept a journal for coupling to the reaction mass; and
      a lattice structure surrounding the central structure, the lattice structure having main ribs extending from the central structure and having interconnecting ribs interconnecting the main ribs;
   a top plate composed of a metallic material and coupled to a top surface of the core body; and
   a bottom plate composed of a metallic material and coupled to a bottom surface the core body, the bottom surface configured for engaging a ground surface;
   wherein the composite material is selected with stiffness and density such that a resonant frequency of the baseplate is higher than a vibration frequency to which the baseplate is subjected when the reaction mass is actuated to generate seismic source signals for transmission through the ground surface.

13. The baseplate of claim 12, wherein the top plate is configured for supporting a frame component of the seismic vibrator.

14. The baseplate of claim 13, wherein the bottom plate is coupled to a bottom surface of the core body and the bottom surface defines a round footprint, the frame structure being supported outside the round footprint.

15. The baseplate of claim 12, wherein the composite material has a lower density than the metallic material.

16. A baseplate, comprising:
   a core body composed of a composite material;
   a substantially round bottom portion comprising a bottom plate coupled to the core body and defining a footprint configured to engage a ground surface; and
   a top portion comprising a top plate coupled to the core body and having a different shape than the substantially round bottom portion, the top portion comprising shelves extending beyond a perimeter of the substantially round bottom portion, the top portion configured to be coupled to a reaction mass of a seismic vibrator for generating seismic source signals for transmission through the ground surface;
   wherein the composite material is selected with stiffness and density such that a resonant frequency of the baseplate is higher than any vibration frequency to which the baseplate is subjected when generating the seismic source signals.

17. The baseplate of claim 16, wherein the core body comprises a non-metallic carbon fiber composite material.

18. A baseplate, comprising:
   a core body at least partially composed of a non-metallic composite material and comprising a central structure configured for a journal to be coupled to a reaction mass of a seismic vibrator to generate seismic source signals for transmission through a ground surface;

a top portion comprising a top plate composed of a metallic material and coupled a top surface of the core body; and a bottom portion comprising a bottom plate composed of a metallic material and coupled to a bottom surface of the core body, the bottom portion defining a footprint configured to engage a portion of the ground surface;

wherein the composite material is selected with stiffness and density such that a resonant frequency of the baseplate is higher than any vibration frequency to which the baseplate is subjected when generating the seismic source signals.

19. The baseplate of claim 18, wherein the core body comprises a plurality of radial ribs extending from the central journal structure and a plurality of circumferential ribs interconnecting the radial ribs, and wherein the non-metallic composite material has a lower density than the metallic material.

\* \* \* \* \*